(12) United States Patent
Kitamura et al.

(10) Patent No.: US 6,747,765 B2
(45) Date of Patent: *Jun. 8, 2004

(54) IMAGE READING SYSTEM

(75) Inventors: Shingo Kitamura, Odawara (JP); Hirokazu Takahashi, Matsudo (JP); Hiroshi Mogi, Ibaraki-ken (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/161,374

(22) Filed: Sep. 28, 1998

(65) Prior Publication Data

US 2002/0015196 A1 Feb. 7, 2002

(30) Foreign Application Priority Data

Sep. 29, 1997 (JP) .............................. 9-279346

(51) Int. Cl.$^7$ ................................. H04N 1/04
(52) U.S. Cl. ....................... 358/497; 358/474
(58) Field of Search ............................... 358/497, 486, 358/498, 406, 400, 401, 404, 437, 505, 408, 475, 474, 494

(56) References Cited

U.S. PATENT DOCUMENTS

| | | | | |
|---|---|---|---|---|
| 4,789,929 A | * | 12/1988 | Nishimura et al. | 364/413 |
| 4,899,227 A | | 2/1990 | Yamada | 358/452 |
| 5,402,252 A | | 3/1995 | Kojima | 358/486 |
| 5,720,894 A | | 2/1998 | Neev et al. | 216/65 |
| 5,786,360 A | | 7/1998 | Neely | 219/121.77 |
| 5,796,928 A | * | 8/1998 | Toyomura | 395/106 |
| 5,825,512 A | * | 10/1998 | Okita | 358/496 |
| 5,903,363 A | * | 5/1999 | Yoguchi et al. | 358/474 |
| 6,097,852 A | * | 8/2000 | Yamamoto | 382/282 |
| 6,236,471 B1 | * | 5/2001 | Lee | 358/474 |

FOREIGN PATENT DOCUMENTS

| | | | |
|---|---|---|---|
| EP | 0 363 983 A2 | 4/1990 | |
| EP | 0 571 971 A1 | 12/1993 | |
| EP | 0 309 146 B1 | 1/1998 | |
| EP | 0 836 906 A1 | 4/1998 | |
| JP | 7-177319 | 7/1995 | |
| JP | 07177319 | * 7/1995 | H04N/1/10 |
| WO | WO 98/55035 | 12/1998 | |

* cited by examiner

*Primary Examiner*—Kimberly Williams
*Assistant Examiner*—Negussie Worku
(74) *Attorney, Agent, or Firm*—Fitzpatrick, Cella, Harper & Scinto

(57) ABSTRACT

An image reading system constructed as in the following in order to shorten a time from a turn-on of an original illuminating lamp to a substantial image reading operation and perform a high speed scanning. A position and size of an original which do not require a stable light amount of the original illumination lamp are read during a forwards pre-scanning operation period (tps) during which the light amount is unstable after the start of the pre-scanning. During the period (tacs1) after a timing (t1) when the light amount becomes stable during the forwards pre-scanning operation, an original color information is read from an area of the original from which the color information cannot be read during the backwards pre-scanning operation. Accordingly, the total time required for the pre-scanning operation can be made shorter than that required by a conventional pre-scanning operation which reads the original information and color information only during the forwards pre-scanning operation.

17 Claims, 18 Drawing Sheets

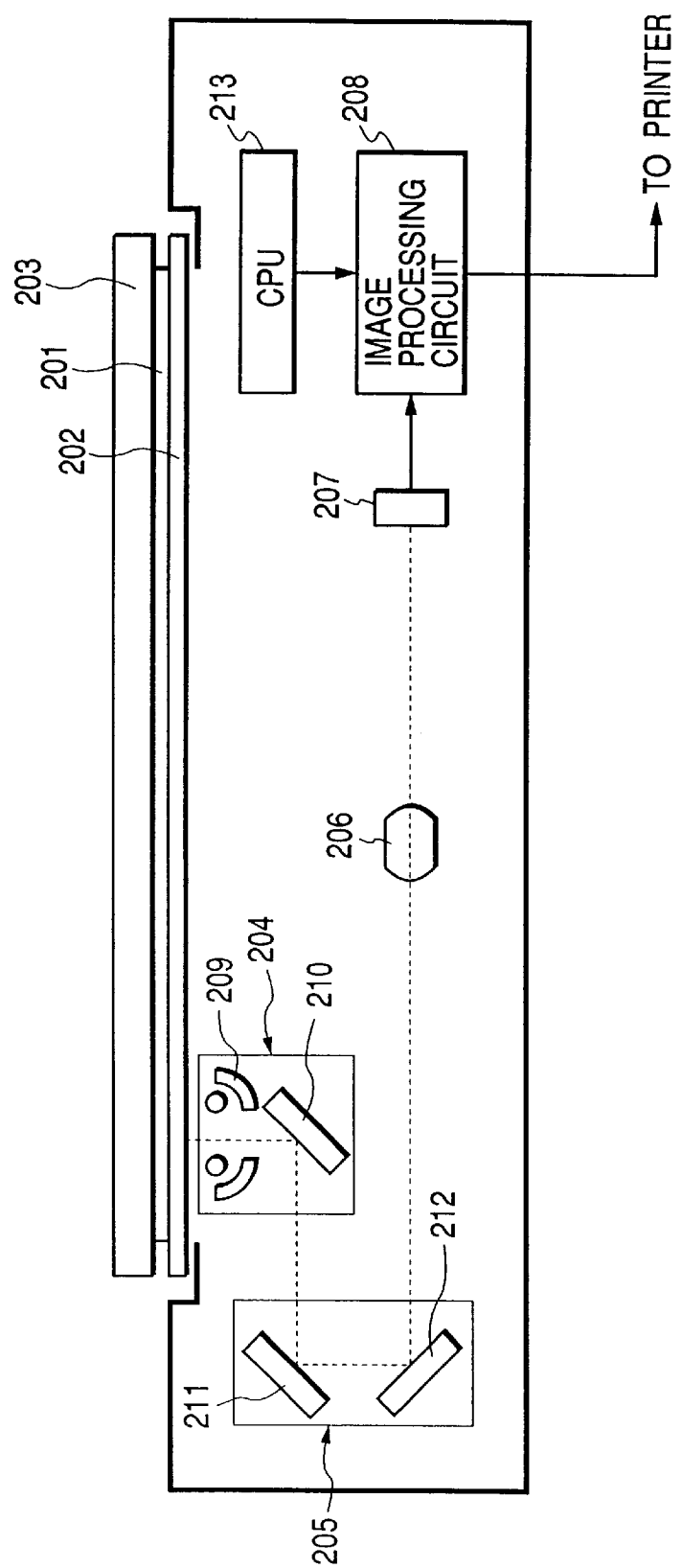

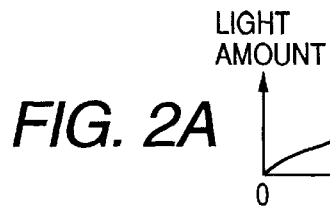
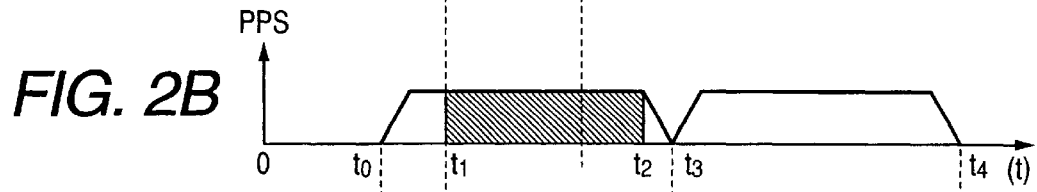
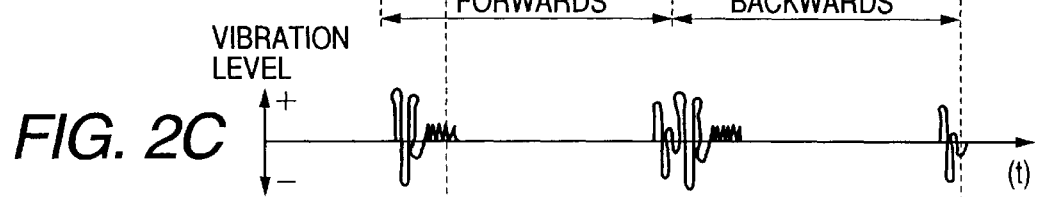
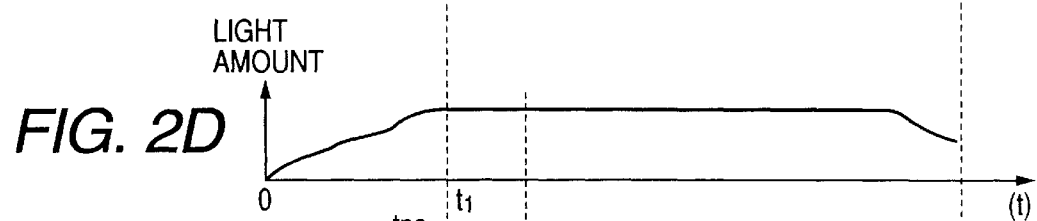
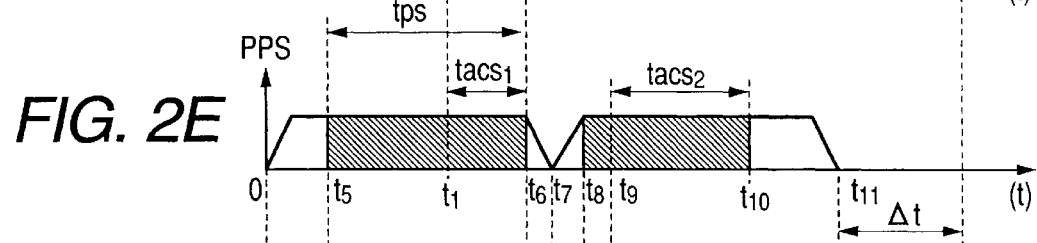
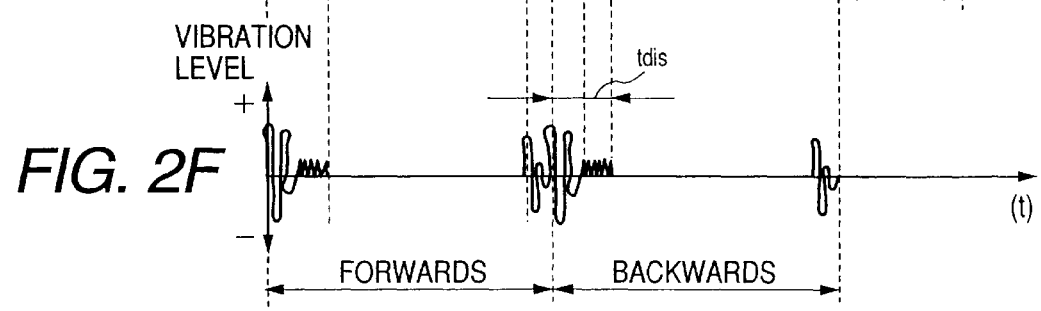

IMAGE READING SYSTEM

BACKGROUND OF THE INVENTION

1. Field of the Invention

The present invention relates to an image reading system including an illuminating means for illuminating an original and a reading means for reading image information of the original from light reflected from the original illuminated by the illuminating means while moving forwards and backwards.

2. Related Background Art

In a color image reading system for reading a color image of an original illuminated by an original illuminating lamp, a pre-scanning is generally performed prior to the substantial scanning in order to confirm a presence/absence of an original, an original size, an original position, original color information and the like.

In an image reading system used with a copier having a variable magnification function or in other apparatuses, a reading optical system for reading an original image to be copied is moved from a home position and accelerated to a motion speed suitable for a read magnification factor, and thereafter the original image is read while the motion speed is maintained unchanged. Most of such image reading systems adopt a stepping motor in view of cost and high precision position alignment.

In order for a stepping motor to drive a scanner at high speed and with low vibrations, it is essential to provide through-up and through-down of the motor. In order to read color information, it is necessary to read the color image at a constant speed and without vibrations. Accordingly, system design generally requires a preliminary drive period of the motor to attenuate vibrations generated during the through-up.

Notches or jags of a read image are formed by using a marginal step angle and drive torque of a stepping motor, the magnitudes of of which are based on the read magnification factor of an original. In most cases, jags can be suppressed by dividing a step angle of the stepping motor into micro-step angles by which the motor is driven.

During the pre-scanning, the original size and the like can be read even in an unstable state of the light amount of an original illuminating lamp. However, in reading original color information, it is necessary to perform the pre-scanning in a sufficiently stable state of the light amount. Prior to starting the pre-scanning read operation, it is therefore necessary to provide a stand-by period until the light amount becomes stable. The distance required for the through-up and through-down to suppress vibrations becomes longer as the motor drive speed increases. This becomes an obstacle against making the image reading system compact.

If a motion distance per one micro-step used for suppressing jags becomes nearly equal to a distance between original read lines, jags by a marginal drive torque become conspicuous. The shortest period of drive pulses is limited by a process time of control software of a microprocessor which drives a stepping motor. Therefore, even if a micro-step is used, the motion distance per one micro-step often becomes nearly equal to the distance between original read lines, and jags of a read image are likely to be formed.

SUMMARY OF THE INVENTION

It is an object of the present invention to provide an image reading system capable of shortening an original reading time and realizing a high speed reading.

In order to achieve the above object, according to one embodiment of the invention, there is provided an image reading system comprising: illuminating means for illuminating an original; reading means for reading an image of the original by using light reflected from the original illuminated by the illuminating means; moving means for relatively moving the reading means and the image in first and second directions, the first and second directions being opposite to each other; and control means for controlling to make the reading means read the image while being relatively moved by the moving means in the first direction, and to make the reading means read the same image while being relatively moved by the moving means in the second direction.

According to an another embodiment of the invention, there is provided an image reading method comprising the steps of: illuminating an original with illuminating means; reading an image of the original by using light reflected from the original illuminated by the illuminating means, by using reading means; relatively moving, by moving means, a relative motion between the reading means and the image in first and second directions, the first and second directions being opposite to each other; and controlling to make the reading means read the image while being relatively moved by the moving means in the first direction, and while being relatively moved by the moving means in the second direction.

The above configurations of the embodiments can shorten an original reading time and realize high speed reading.

The above and other objects, features, and advantages of the present invention will become apparent from the following detailed description when read in conjunction with the accompanying drawings and the appended claims.

BRIEF DESCRIPTION OF THE DRAWINGS

FIG. 1 is a block diagram showing an outline structure of a color image reading system according to an embodiment of the invention.

FIG. 2A is a timing chart showing a change with time in an amount of light radiated from an original illuminating lamp of a conventional image reading system.

FIG. 2B is a timing chart showing a change with time in a pulse speed (PPS) of a pulse motor for moving an optical system of the conventional image reading system.

FIG. 2C is a timing chart showing a change with time in a vibration level generated by the conventional image reading system.

FIG. 2D is a timing chart showing a change with time in an amount of light radiated from an original illuminating lamp of an image reading system according to an embodiment of the invention.

FIG. 2E is a timing chart showing a change with time in a pulse speed (PPS) of a pulse motor for moving an optical system of an embodiment of the invention.

FIG. 2F is a timing chart showing a change with time in a vibration level generated by an embodiment of the invention.

FIG. 13 is a block diagram showing an optical system including a scanner unit and the like.

DETAILED DESCRIPTION OF THE PREFERRED EMBODIMENTS

Figure 3:
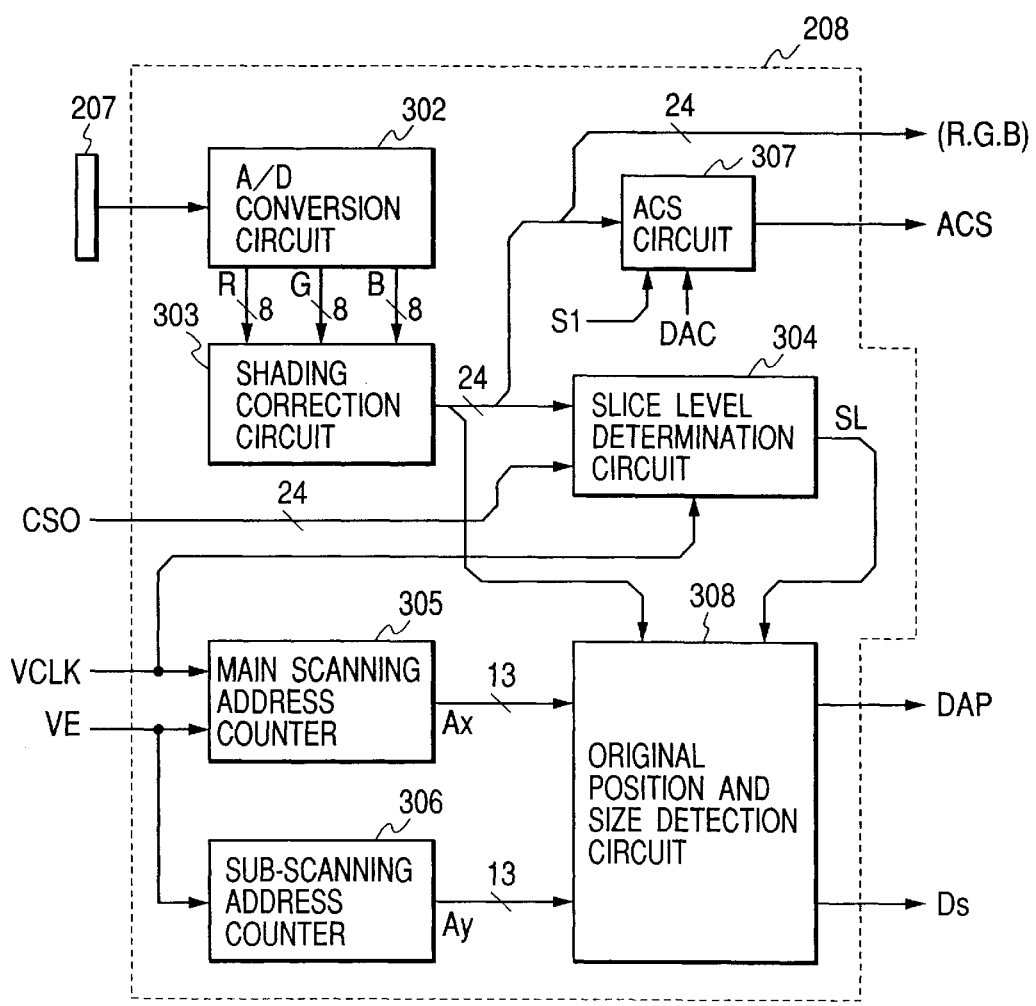
FIG. 3 is a block diagram showing an outline structure of an image processing circuit shown in FIG. 1.

Embodiments of the invention will be described with reference to the accompanying drawings.

A first embodiment of the invention will be described with reference to FIGS. 1 to 9.

FIG. 1 is a block diagram showing an outline structure of a color image reading system of the first embodiment. This system has in its upper side an original support glass 202 for placing an original 201 thereon and an original cover 203 for holding down the original 201 placed on the original support glass. In the lower side, the system has an optical system as a reading means and an image processing circuit 208. The optical system includes a first mirror unit 204, a second mirror unit 205, a focussing lens 206, and a color CCD (charge coupled device) line sensor 207 (hereinafter simply called a line sensor) having R (red), G (green) and B (blue) three color separation filters (not shown).

The first mirror unit 204 has an original illuminating lamp 209 as an illuminating means and a mirror 210 fixedly mounted thereon, and the second mirror unit 205 has mirrors 211 and 212 fixedly mounted thereon. The image processing circuit 208 is connected to a CPU 213 which controls the operation of the circuit 208. The original illuminating lamp 209 is controlled by CPU 213 via a driver circuit (not shown), and the first and second mirror units 204 and 205 are controlled by CPU 213 via driver mechanisms (not shown).

The first mirror unit 204 and original illuminating lamp 209 scan the original 201 placed on the original support glass 202 at a speed two times as high as the speed of the second mirror unit 205.

The original 201 placed on the original support glass 202 is illuminated by the original illuminating lamp 209. Light reflected from the original 201 is guided by the mirrors 210, 211, and 212 to the focussing lens 206, and focussed upon the line sensor 207. Light focussed upon the line sensor 207 is separated by the color separation filters into R, G, and B components and converted into color image signals which are supplied to the image processing circuit 208. An electrical scan (main scanning) by the line sensor 207 and a mechanical scan (sub-scanning) by the original illuminating lamp 209 and mirrors 210 to 212 are repeated to obtain image information of the whole area of an original. The image processing circuit 208 processes input image signals and outputs the processed image signals to an externally connected printer or the like.

A pre-scanning operation by the color image reading system shown in FIG. 1 will be described presently. A program for executing this pre-scanning operation is stored in a memory of CPU 213 shown in FIG. 1. In accordance with this program, CPU 213 controls the system. FIGS. 2A to 2C are timing charts illustrating a read operation by a conventional image reading system, and FIGS. 2D to 2F are timing charts illustrating the same read operation by the image reading system of FIG. 1. FIGS. 2A and 2D are timing charts showing a change with time in an amount of light radiated from the respective original illuminating lamps, FIGS. 2B and 2E are timing charts showing a change with time in a pulse speed (PPS) of a pulse motor for moving the respective optical systems, and FIGS. 2C and 2F are timing charts showing a change with time in a vibration level generated by the respective systems.

First, a conventional image read operation will be described with reference to FIGS. 2A to 2C. When an original read command is entered, the original illuminating lamp 209 is turned on. However, the light amount is unstable immediately after the lamp is turned on, during a period (0 to t1) as shown in FIG. 2A. According to the conventional techniques, reading an original image starts at a time t1 when the light amount of the original illuminating lamp becomes stable, and continues until a time t2. In accordance with image signals output from the line sensor 207 during this read operation, CPU 213 judges a presence/absence of an original, an original position, and an original size, and acquires original color information.

In order to prepare for the read start at the time t1, driving the pulse motor starts at a time t0. The start of driving the pulse motor is set earlier than the read start, because as shown in FIG. 2C, vibrations generated in the system are large during an acceleration period immediately after the start of driving the pulse motor, and an image cannot be read stably during this acceleration period. After the image pre-scanning is completed, the motor is stopped and driven in the reverse direction to return the optical system to the home position without reading the image during the backwards scanning.

Next, the image read operation of the first embodiment of the invention will be described with reference to FIGS. 2D to 2F.

When an original read command is entered, the original illuminating lamp 209 is turned on and at the same time the motor is driven. When acceleration of the motor is completed and the speed becomes constant, reading an original image starts and continues until a time t6. An image is read in an unstable light amount of the original illuminating lamp during the period from a time t5 to the time t1, immediately following the start of the image read operation. Even if there is a variation of the light amount, a presence/absence of an original, an original size, and an original position can be judged because they are judged from density data of image signals output from the line sensor 207. Thus, these things are judged from the image signal output from the line sensor 207 during that period.

During the period tacs1 from the time t1 to the time t6 in a stable light amount state, not only are the presence/absence of an original, original size, and original position judged, but also color information of the original is read. The reading of color information cannot begin until time t1 because the color information cannot be read correctly unless the light amount of the original illuminating lamp becomes constant and vibrations generated upon driving the motor are reduced considerably. After the completion of the image read operation in the forwards scanning, the motor is stopped and driven in the reverse direction to start a backwards scanning operation. In the backwards scanning operation and during a period tacs2 from a time t9 to a time t10 without vibrations at the start of driving the pulse motor, original color information is read from an area other than the area read during the period tacs1 in the forwards scanning operation.

CPU 213 outputs a reference signal S1 and a signal S2. The reference signal S1 instructs to read the color information of an original, during the forwards scanning operation after the lamp light amount becomes stable, from an area where the backwards scanning operation cannot read the color information. The signal S2 indicates the backwards scanning operation and is output during the backwards scanning operation of the optical system. CPU 213 also outputs, at times to be later described, a video clock signal VCLK, a video enable signal VE, and a slice level signal CSO to be used by a slice level determination circuit.

In a color image reading system of the type that an optical system is moved reciprocally, the time taken by the pre-scanning operation of this embodiment can be shortened by Δt as shown in FIG. 2E as compared to a conventional pre-scanning operation which judges the presence/absence of an original, original size, and original position and reads color information only during the forwards scan.

Furthermore, since the original color information is read during the forwards scanning period tacs1, from the area corresponding to the period tdis during which color information cannot be read because of vibrations generated at the start of the backwards scanning operation. Accordingly, it is not necessary to provide means for absorbing vibrations to read the original color information in the backwards scanning operation, thus enabling the image reading system to be made compact.

FIG. 3 is a block diagram showing an outline structure of the image processing circuit 208.

The image processing circuit 208 includes: an analog/digital (A/D) conversion circuit (hereinafter called an A/D conversion circuit) 302 for converting an input analog signal into a digital signal; a shading correction circuit 303 for correcting shading distortion; a slice level determination circuit 304 for determining a slice level of an image signal which circuit is used for detecting an original position or size to be later described; a main scanning address counter 305, a sub-scanning address counter 306; an image color information recognition circuit (hereinafter called an ACS circuit) 307; and an original position/size detection circuit 308. Each of these components are connected to and controlled by CPU 213.

The slice level determination circuit 304 is reset by the video clock signal VCLK and determines a slice level in accordance with the slice level signal CSO supplied from CPU 213. The determined slice level signal is input to the original position/size detection circuit and is used for detecting an original position, an original size and the like to be described later.

The main scanning address counter 305 is initialized by the video enable signal VE supplied from CPU 213 and counts the video clock signal VCL output from CPU 213 to thereby output an address signal Ax corresponding to an address in a main scanning direction X on the original support glass 202. The sub-scanning address counter 306 counts the video enable signal VE output from CPU 213, starting from an original reference position SP to be described later, and outputs an address signal Ay corresponding to an address in the sub-scanning direction Y on the original support glass 202. The address signals output from the address counters 305 and 306 are input to the original position/size detection circuit 308.

The ACS circuit 307 is a circuit for discriminating between a color image and a black-and-white image of the original 201. The ACS circuit 307 is activated by the signals S1 and S2 output from CPU 213 during the pre-scanning operation of the optical system, and serves as first and second original area color information reading means which judges color information of an original. Namely, the ACS circuit 307 is controlled to be operative only during reading a first area of an original during the forwards pre-scanning operation while the signal S1 is supplied and during reading a second area different from the first area of the original during the backwards pre-scanning operation while the signal S2 is supplied. As the forwards pre-scanning operation starts, image signals (R, G, B) of the image information of the original 201 are input from the line sensor 207 to the A/D conversion circuit 302, which converts the input image signals (R, G, B) into digital signals. Irregular outputs of the line sensor 207 and original illuminating lamp 209 contained in the digital image signals are corrected by the shading correction circuit 303. The shading corrected image signals (R, G, B) are input to the slice level determination circuit 304 and ACS circuit 307. The slice level determination circuit 304 determines the slice level of the image signals in accordance with the slice level signal CSO supplied from CPU 213 and the image signals (R, G, B). The determined slice level is input as a slice level signal SL to the original position/size detection circuit 308, together with the main scanning address signal Ax output from the main scanning address counter 305 and the sub-scanning address signal Ay output from the sub-scanning address counter 306. In accordance with the input signals SL, Ax, and Ay, the original position/size detection circuit 308 detects the original position and size in a manner to be described later and outputs an original position address signal DAP and an original size signal Ds. The original position/size detection circuit 308 serves as an original information reading means.

During the above operation, since the signal S1 from CPU 213 is not input to the ACS circuit 307 input with the shading corrected image signals (R, G, B), the judging operation of reading color information of the original is not performed.

Similar to the forwards pre-scanning operation, as the backwards pre-scanning operation starts, shading corrected image signals (R, G, B) are input to the slice level determination circuit 304 and ACS circuit 307. The slice level signal SL determined by the slice level determination circuit 304 is input to the original position/size detection circuit 308, together with the address signals Ax and Ay output from the main scanning address counter 305 and sub-scanning address counter 306. The ACS circuit 307 performs an ACS operation relative to the area where the backwards scan operation cannot perform the ACS operation, during the forwards scan operation according to the signal S1, whereas the ACS circuit 307 performs the ACS operation relative to the area where the forwards scan operation cannot perform the ACS operation, during the backwards scan operation according to the signal S2. By this, it is discriminated whether an image 20 of the original is monochromatic or color by a method described hereinafter. The result of this discrimination is output as the ACS signal.

Pre-scanning operations of the image reading system constructed as above will be described, the operations including an original detecting operation, an original size detecting operation, an original position detecting operation, and an original color information reading operation.

Figure 4A:
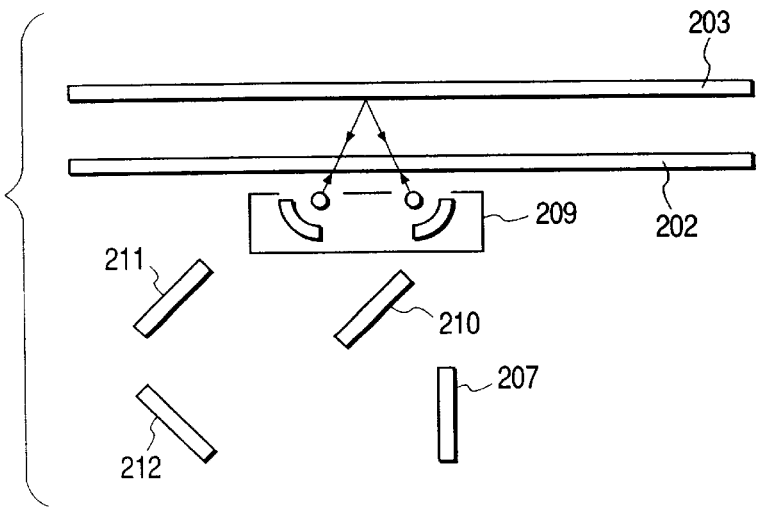
FIGS. 4A and 4B are diagrams showing a layout of an optical system and illustrating an original detecting operation.
Figure 4B:
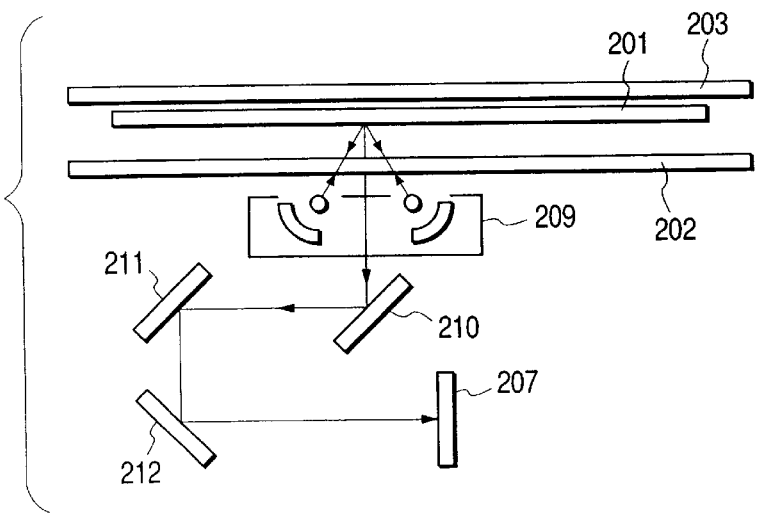

FIGS. 4A and 4B are diagrams showing a layout of the optical system and illustrating the original detecting operation.

The lower surface of the original cover 203 has a mirror reflection worked surface to prevent irregular reflection of light radiated from the original illuminating lamp 209 onto the original cover 203. The original illuminating lamp 209 has two illuminating lamps which are disposed so that light radiated from one lamp is reflected by the lower surface of the original cover 203 toward the other lamp. The mirrors 210 to 212 guide light reflected by the illumination lamp 209 to the line sensor 207.

As shown in FIG. 4A, if there is no original on the original support glass 202, light radiated from the original illuminating lamp 209 will not be irregularly reflected so that the line sensor 207 does not receive light reflected from the original support glass 203. A portion of the line sensor 207 corresponding to an area not received the reflection light or an area without an original is judged as a black color portion by the original position/size detection circuit 308. As shown in FIG. 4B, if there is an original 201 on the original support glass 202, illumination light from the original illuminating lamp 209 is irregularly reflected by the original 201 and guided via the mirrors 210 to 212 to the line sensor 207.

A presence/absence of an original can therefore be determined based on whether or not reflection light is guided to the line sensor 207. In accordance with a portion of the line sensor 207 corresponding to an area of the original, the original position/size detection circuit 308 can judge that there is an original, in a manner to be described later.

Next, with reference to FIGS. 5 and 6, an original size detecting operation and an original position detecting operation will be described.

Figure 5:
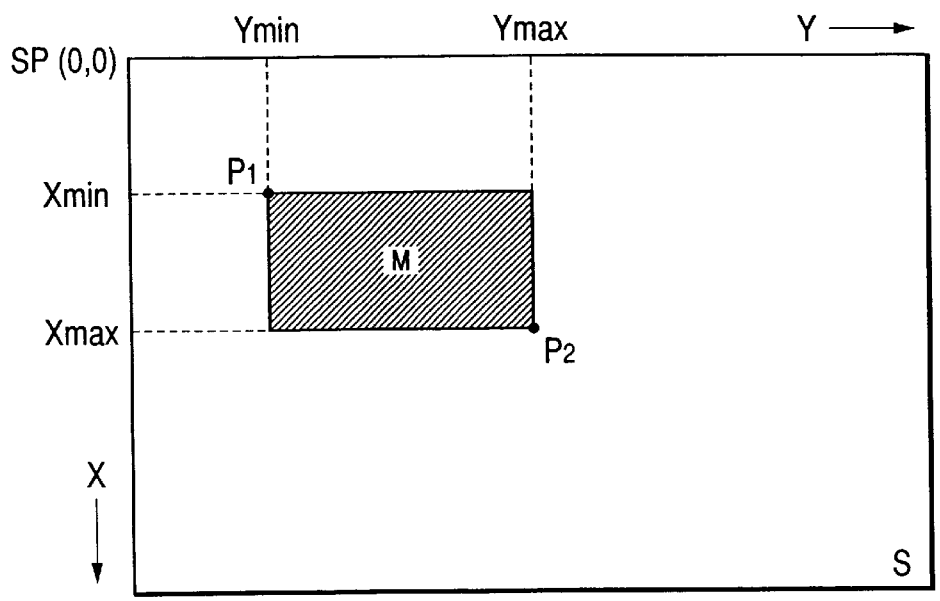
FIG. 5 is a diagram illustrating an original size discriminating operation and an original position detecting operation.
Figure 6:
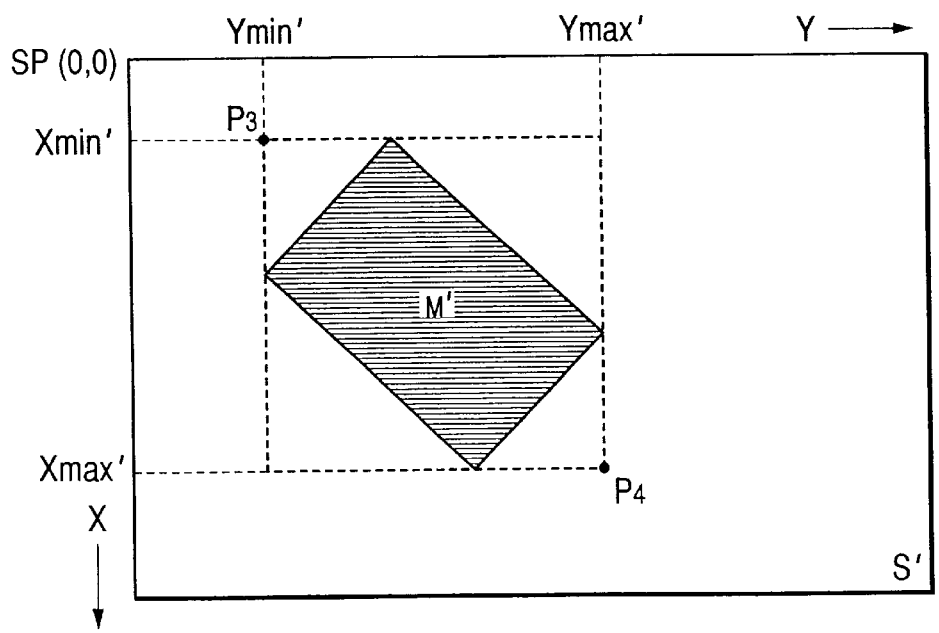
FIG. 6 is a diagram illustrating an original size discriminating operation and an original position detecting operation.

FIGS. 5 and 6 are diagrams illustrating the original size detecting operation and original position detecting operation. In FIGS. 5 and 6, S represents the original support glass 202, and M and M' represent originals 201 placed on the original support glass 202. An arrow X indicates the main scanning direction, an arrow Y indicates the sub-scanning direction, and SP represents an original support reference position of the original support glass.

Similar to the original presence/absence detecting operation, as the placed original M or M' is scanned with the optical system during the forwards scanning operation, the original position/size detection circuit 308 judges a presence of the original M or M' upon reception of reflection light from the original M or M'. In the following description, it is assumed that the originals M and M' are white originals for simplicity.

Referring to FIG. 5, during the scan operation along the main scanning direction, the original coordinates Xmin and Xmax are detected from the outputs of the line sensor 207, the original coordinate Xmin being the nearest point to the origin of the main scanning where a black image changes first to a white image, and the original coordinate Xmax being the farthest point from the origin of the main scanning where the white image changes lastly to the black image. During the scanning operation along the sub-scanning direction, the original coordinates Ymin and Ymax are detected from the outputs of the line sensor 207, the original coordinate Ymin being the point where a black image changes first to a white image, and the original coordinate Ymax being the point where the white image changes lastly to the black image. The coordinate value P1 (Xmin, Ymin) is judged as the original position, and a rectangle having a diagonal line extending between the coordinate values P1 (Xmin, Ymin) and P2 (Xmax, Ymax) is judged as the original size.

In the case of the original M' placed obliquely as shown in FIG. 6, similar to the case shown in FIG. 5, during the scanning operation along the main scanning direction, the original coordinates Xmin' and Xmax' are detected from the outputs of the line sensor 207, the original coordinate Xmin' being the nearest point to the origin of the main scanning where a black image changes first to a white image, and the original coordinate Xmax' being the farthest point from the origin of the main scanning where the white image changes lastly to the black image. During the scanning operation along the sub-scanning direction, the original coordinates Ymin' and Ymax' are detected from the outputs of the line sensor 207, the original coordinate Ymin' being the point where a black image changes first to a white image, and the original coordinate Ymax' being the point where the white image changes lastly to the black image. The coordinate value P3 (Xmin', Ymin') is judged as the original position, and a rectangle having a diagonal line extending between the coordinate values P3 (Xmin', Ymin') and P4 (Xmax', Ymax') is judged as the original size.

The above-described original position/size detecting operation is performed by the original position/size detection circuit 308.

Figure 7:
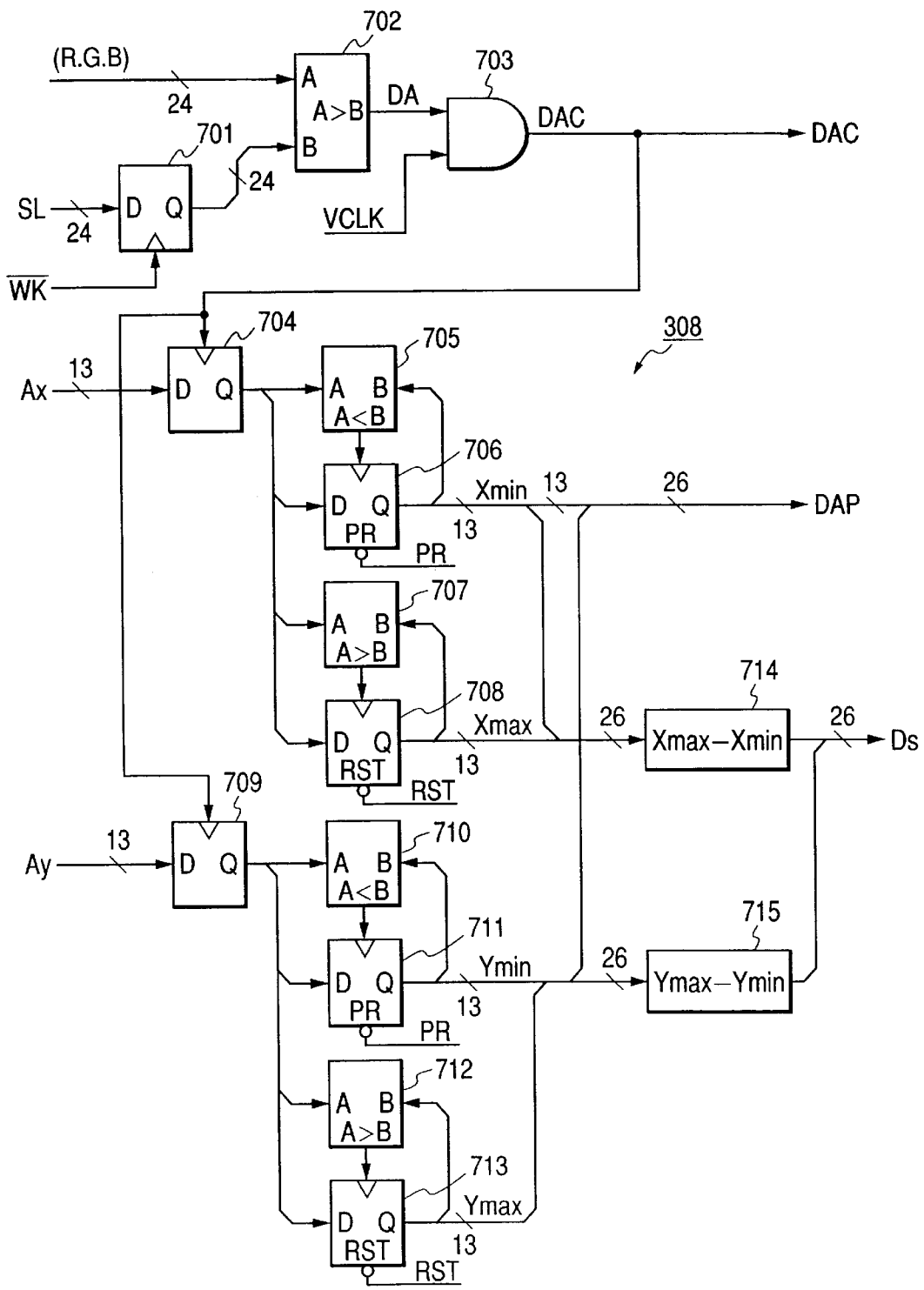
FIG. 7 is a block diagram showing an outline structure of an original position/size detecting circuit shown in FIG. 3.

FIG. 7 is a block diagram showing an outline structure of the original position/size detection circuit 308. As shown in FIG. 7, the original position/size detection circuit 308 is mainly constituted of flip-flop circuits (hereinafter called F/F) 701, 702, and 704 to 713, an AND gate 703, and calculation circuits 714 and 715.

The shading corrected image signal (R, G, B) from the shading correction circuit 303 is applied to a terminal A of F/F 702, and at the same time the slice level signal SL from the slice level determination circuit 304 is applied via F/F 701 to a terminal B of F/F 702. The slice level signal SL and the image signal (R, G, B) applied to the terminals A and B are compared. It is judged from the comparison result whether the currently scanned area is an original area or not. Specifically, whether the currently scanned area is a black image or a white image is judged based upon whether the signal level of the image signal (R, G, B) is larger than the slice level. If the image signal level is larger than the slice level SL, it is judged as the original area, and F/F 702 outputs an original detection signal DA.

The original detection signal DA is input to the AND gate 703. The original detection signal DA is output from the AND gate as a DAC signal, synchronously with the video clock signal VCLK supplied from CPU 213. The DAC signal is input to F/F 704 and F/F 709.

F/F 704 is supplied with the main scanning address signal Ax from the main scanning address counter 305. An address of an original area in the main scanning direction is supplied to the next stage circuit synchronously with an input of the DAC signal.

F/Fs 705 and 706 constitute a circuit for determining the minimum address from addresses input from F/F 704. F/F 706 is preset with a maximum address value at the start of pre-scanning. This maximum preset address is compared with the input address by F/F 705. If the input address is smaller than the preset address, this input address is stored in F/F 706, and the last input address is stored in F/F 706 as the minimum address Xmin.

F/Fs 707 and 708 constitute a circuit for determining the maximum address from addresses input from F/F 704. F/F 706 is cleared to zero at the start of pre-scanning. The value in F/F 708 is compared with the input address. If the input address is larger than the value in F/F 708, the input address is stored in F/F 708. By repeating the compare/store operation of an input address, the maximum address Xmax of the main scanning address signals Ax is eventually stored in F/F 708.

Similar to the main scanning address described above, F/Fs 709 to 713 determine the sub-scanning minimum and maximum addresses Ymin and Ymax from the sub-scanning address signals Ay, and the determined addresses are stored in F/Fs 711 and 713.

The original position address signal DAP (Xmin, Ymin) is generated from the main scanning minimum address Xmin and sub-scanning minimum address Ymin.

The calculation circuit 714 performs a calculation of the following equation (1) by using the determined main scanning minimum and maximum addresses Xmin and Xmax. The calculation circuit 715 performs a calculation of the following equation (2) by using the determined sub-scanning minimum and maximum addresses Ymin and Ymax.

$$Dsx = X\max - X\min \quad (1)$$

$$Dsy = Y\max - Y\min \quad (2)$$

From these calculation results, the original size signal Ds (Dsx, Dsy) is generated.

The original position address signal DSP (Xmin, Ymin) and the original size signal Ds (Dsx, Dsy) are supplied to CPU 213 or an externally connected output device such as a printer.

Next, an original color information reading operation will be described with reference to FIG. 8 which operation is performed during partial periods of the forwards and backwards pre-scanning operations. As described earlier, the original color information reading operation is performed by the ACS circuit 307 which is activated by the signal S1 supplied from CPU 213.

Figure 8:
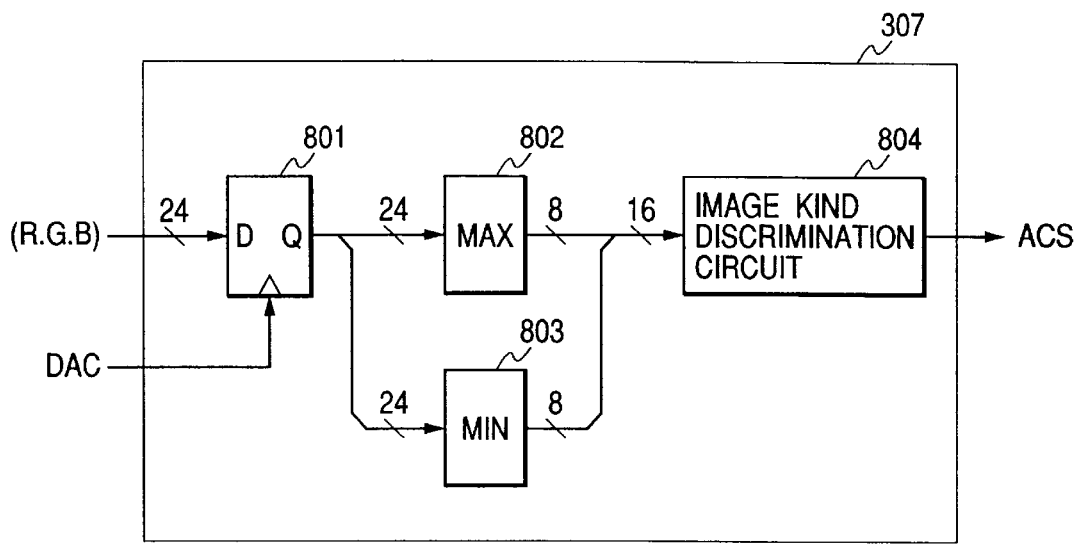
FIG. 8 is a block diagram showing an outline structure of an ACS circuit shown in FIG. 3.

FIG. 8 is a block diagram showing the outline structure of the ACS circuit 307.

As shown in FIG. 8, the ACS circuit 307 includes a flip-flop (F/F) circuit 801, a maximum value calculation circuit 802, a minimum value calculation circuit 803, and an image kind discrimination circuit 804 having a preset look-up table.

The shading corrected image signal (R, G, B) is input to F/F 801. F/F 801 supplies only the image signal in the original detected area to the maximum and minimum value calculation circuits 802 and 803, in response to the DAC signal supplied from the AND gate 703 shown in FIG. 7. The maximum value calculation circuit 802 derives a maximum value Max (R, G, B) from the input image signal (R, G, B), and the minimum value calculation circuit 803 derives a minimum value Min (R, G, B), the maximum and minimum values being input to the image kind discrimination circuit 804.

The image kind discrimination circuit 804 judges whether the maximum and minimum values Max and Min are in a monochromatic image area or a color image area. Similar to the forwards scan operation, the original position/size detection circuit 308 detects the original position/size during the backwards scan operation. However, the output signals DAP and Ds are invalidated by CPU 213.

Figure 9:
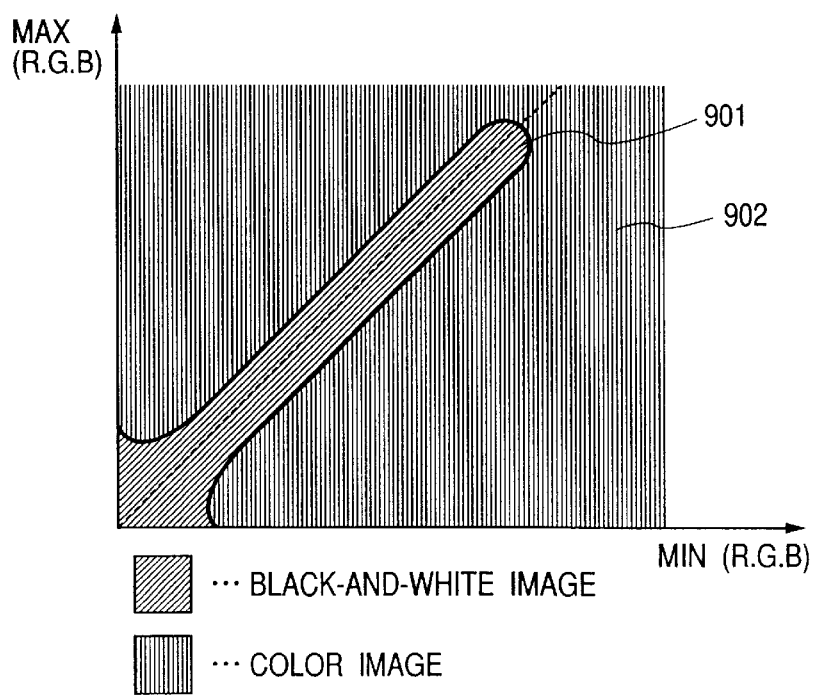
FIG. 9 is a diagram showing an example of regions discriminating between a black-and-white image and a color image.

FIG. 9 is a diagram showing an example of regions discriminating between a monochromatic image and a color image. This discrimination data is stored in the image kind discrimination circuit 804 as the look-up table. In FIG. 9, a region 901 is a monochromatic image region, and a region 902 is a color image region. The image kind can be discriminated by setting the minimum value Min (R, G, B) to the X-axis and the maximum value Max (R, G, B) to the Y-axis. The image kind discriminated by the image kind discrimination circuit 804 is supplied as the ACS signal to an externally connected output device such as a printer.

As described above, in this embodiment, during the forwards scanning operation, the original information which does not require a stable light amount is detected in an unstable light amount state immediately after the original illuminating lamp 209 is turned on, and the original color information is read after the light amount of the original illuminating lamp 209 becomes stable. During the backwards scanning operation, the original color information is read in a light amount stable state from an original area other than the area from which the original color information was read during the forwards scanning operation. It is therefore possible to shorten the time from turning on the illuminating means to starting reading an image. The time required for the pre-scanning operation can be shortened and a high speed pre-scanning operation can be realized easily, which has been difficult for a conventional pre-scanning operation of an image reading system.

Furthermore, the original color information, corresponding to the period while vibrations are generated immediately after the start of driving the motor in the backwards scanning operation, is read in the forwards scanning operation. Accordingly, it is not necessary for a color image reading system to provide the through-up and vibration absorber for driving it with low vibrations. Therefore, the size of the equipment can be reduced.

Next, a second embodiment will be described with reference to FIGS. 10 to 18.

Figure 10:
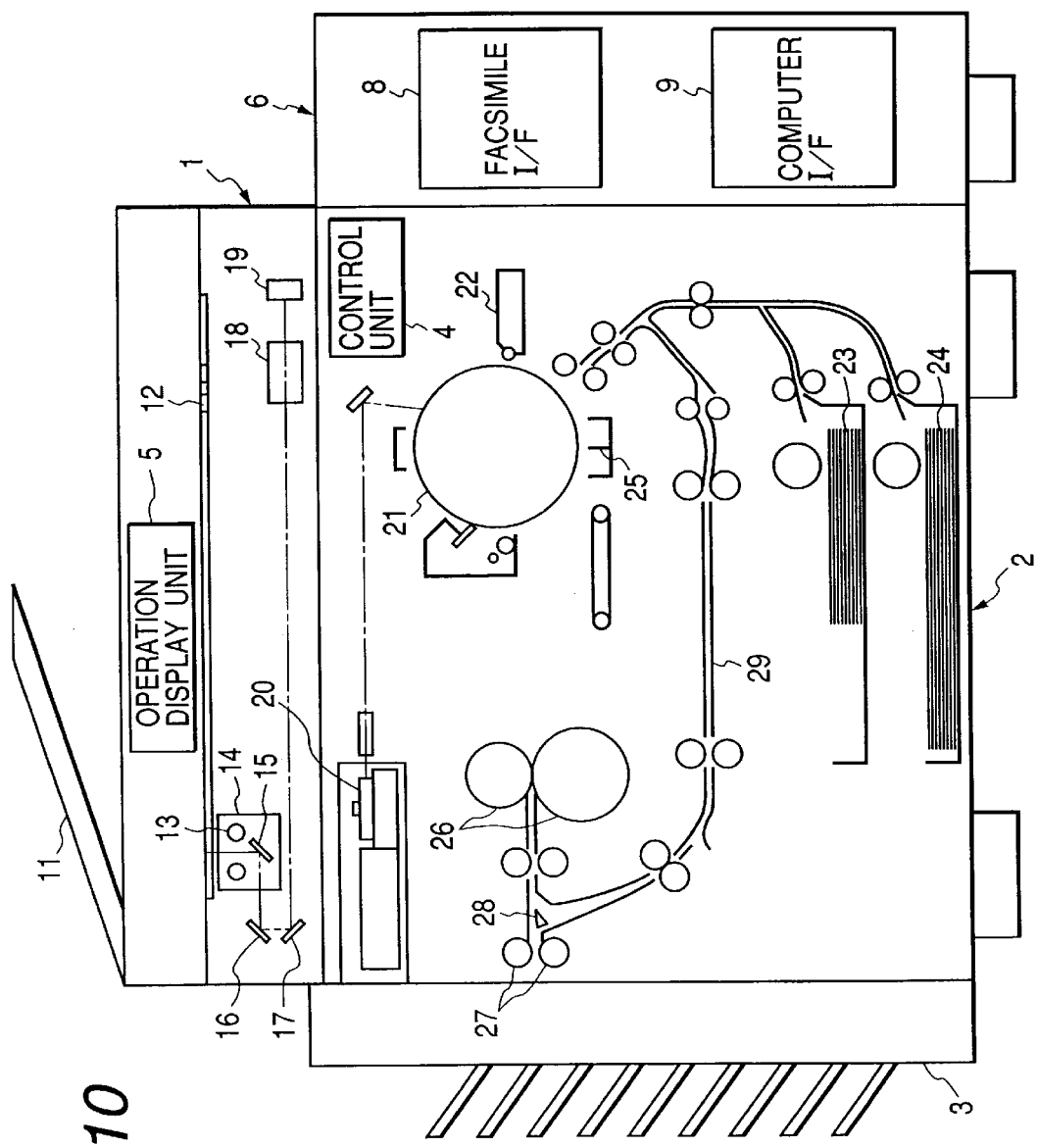
FIG. 10 is a cross sectional view showing a structure of a multi-function digital copier incorporating an image reading system according to a second embodiment.

FIG. 10 is a schematic cross sectional view of a multi-function digital copier (hereinafter simply called a copier) to which the image reading system of the second embodiment is applied.

The copier includes an image reading apparatus (hereinafter called a reader unit) 1, an image output apparatus 2 (hereinafter called a printer unit), a sorter unit 3, a control unit 4, an operation display unit 5 including an operation unit 5a and a display unit 5b, and an external apparatus 6. The reader unit 1 reads an original and generates image data thereof. The printer unit 2 prints a visible image of image data on a transfer sheet in response to a predetermined print command and has a plurality type of transfer sheet cassettes. The sorter unit 3 sorts transfer sheets printed with the printer unit 2 and accommodates the sorted transfer sheets. The control unit 4 controls the reader unit 1, printer unit 2, and sorter unit 3. The operation unit 5a and display unit 5b are used for selecting, setting, and confirming functions of copy, facsimile, and the like. The external apparatus 6 is electrically connected to the control unit 4.

The external apparatus 6 is provided with a facsimile interface 8 for transmitting an image signal from the reader unit 1 to the external circuit via a line and receiving an image signal from the line, and with a computer interface 9 for transferring an image signal to and from a personal computer, a word processor or the like.

Referring to FIG. 10, as a request for reading an original image is issued, originals (not shown) placed on an original feeder 11 is transported one original after another to a predetermined position of an original support glass 12. As the original is transported to the predetermined position of the original support glass 12, an original illuminating lamp 13 in a scanner unit 14 is turned on. In this state, the scanner unit 14 starts moving at a speed corresponding to a magnification factor to illuminate the original image, synchronously with a read signal being supplied to a CCD image sensor (hereinafter simply called a CCD) 19.

Light reflected from the original image is input to CCD 19 via mirrors 15, 16, and 19 and a lens 18. CCD 10 has several thousand photoelectrical conversion elements disposed in line. The original image input to CCD 19 is converted into an electrical signal for each pixel, and after various processes for the original image signal, the processed signal is supplied to the printer unit 2.

The image signal input to the printer unit 2 is converted into a modulated optical signal (laser beam) by a laser driver 20 serving as an exposure control unit, the laser beam being applied to a pre-charged photosensitive drum 21. A latent image formed on the photosensitive drum 21 by the laser beam is developed by a developer 22. A transfer sheet is transported from a transfer sheet stacker 23 or 24 synchronously with a motion of the top edge of the developed image. A transfer unit 25 transfers the developed image onto the transfer sheet.

The transferred image on the transfer sheet is fixed by a fixing unit 26 and thereafter the transfer sheet is discharged by a paper discharge unit 27 to the outside of the copier. If the sort function of a sorter unit 103 is enabled, the transfer sheet discharged from the paper discharge unit 27 is guided to each bin, whereas if the sort function is not enabled, the transfer sheet is guided to the highest bin or a bin designated by an operator.

Next, a method of sequentially outputting read images on both sides of a single transfer sheet will be described.

A transfer sheet with its one side having an image fixed by the fixing unit 26 is once transported to the paper discharge unit 27, the transport direction of the transfer sheet is reversed by a transport switching member 28, and the transfer sheet is transported back to a re-feed transfer sheet stacker 29.

As the next original is prepared, similar to the above processes, the original image is read and fixed to the other side of the transfer sheet fed from the re-feed transfer sheet stacker 29. In this manner, two original images are output to both sides of one transfer sheet.

Figure 11:
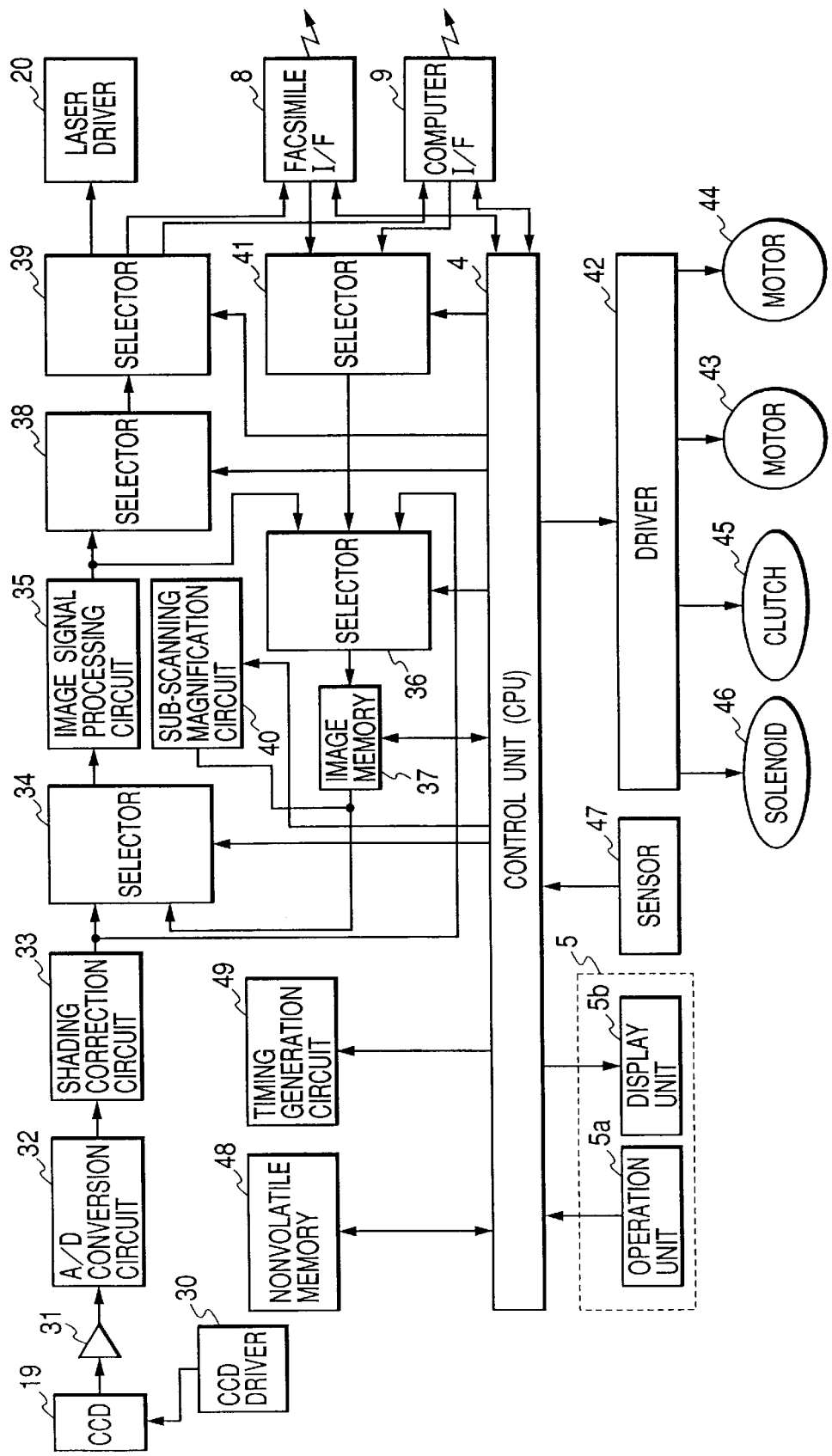
FIG. 11 is a circuit block diagram showing a structure of an image signal processing unit of the copier shown in FIG. 10.

FIG. 11 is a circuit block diagram showing the structure of an image signal processing unit of the copier described above.

Light reflected from an original and applied to CCD 19 is photoelectrically converted by each photoelectric cell of CCD 19 and stored therein as electric charges. The photoelectric cells of CCD 19 are formed on three lines for each color of R (red), G (green), and B (blue), or C (cyan), M (magenta), and Y (yellow) to supply color information. Electric charges stored in respective cells are sequentially read synchronously with a read signal from a CCD driver to obtain analog signals of each line corresponding to the original image.

After the electric charges of one line are read, each cell of CCD 19 is reset to clear the electric charges to thereafter start storing electric charges of next original image signals. The analog signals read from CCD 19 are amplified by a pre-amplifier 31 to make them match an input signal level to an A/D converter 32.

An output signal from the A/D converter 32 is input to a shading correction circuit 33 to correct shading distortion to be caused by a light distribution variation of the illuminating lamp 23 and a sensitivity variation of CCD 19.

An output signal of the shading correction circuit 33 is supplied to selectors 34 and 36. The selector 34 selects either the output of the shading correction circuit 33 or a signal read from an image memory 37 in accordance with an instruction from the control unit 4, and supplies the selected signal to an image processing circuit 35.

The image signal processing circuit 35 performs a variable magnification process of an input image signal in the main-scanning direction. The image signal processing circuit 35 also performs when necessary a repeat process, a contour edge emphasis process using a spatial filter, a marker area judge process (using a luminance level for a black-and-white image and each color signal level for a color image), and a patterning/thickening/masking/trimming process.

A sub-scanning variable magnification circuit 40 performs a variable magnification process of a signal read from the image memory 37 in the sub-scanning direction in response to an instruction from the control unit 4.

An output signal of the image signal processing circuit 35 is supplied to the selector 36 and a selector 38. The selector 38 selects an output of the sub-scanning variable magnification circuit 40 in accordance with an instruction from the control unit 4, and supplies this signal to a selector 39.

The selector 39 supplies the image signal to one of a laser driver 20 in the exposure control unit of the printer unit 2, a transmission unit of a facsimile interface 8, and a computer interface 9, in accordance with an instruction from the control unit 4.

A selector 41 selects one of a signal from a reception unit of the facsimile interface 8 and a signal from the computer interface 9 in accordance with an instruction from the control unit 4. The selector 36 selects one of a signal from the image processing circuit 35, a signal from the shading correction circuit 33, and a signal from the selector 41 in accordance with an instruction from the control unit 4, and supplies the selected signal to the image memory 37. The image memory 37 sequentially stores inputted image signals.

The control unit 4 controls a driver 42 to drive a motor 43 which is a driving means for driving the optical system such as a scanner unit 14, a transfer sheet transport motor 44, a clutch 45, and a solenoid 46, to thereby control the optical system, a paper transport system, and the like while a sensor group 47 is monitored. The optical system exposes an original, and the paper transport system feeds and discharges a transfer sheet for forming an image. A non-volatile memory (e.g., battery backup RAM) is also connected to the control unit 4 which memory stores data specific to the copier, such as test pattern data for printer magnification correction to be later described and actuator drive conditions. The control unit 4 also operates to fetch a mode and an operation request set by using the operation unit 5a of an operation/display unit 5 and display a set mode, an error alarm, and the like on the display unit 5b. The control unit 4 makes a timing generating circuit 49 supply operation timings to each circuit of the copier. The control unit 4 constitutes a detecting means for detecting an operation state of the driving means and a supply current control means for controlling a supply current to the motor 43.

Figure 12:
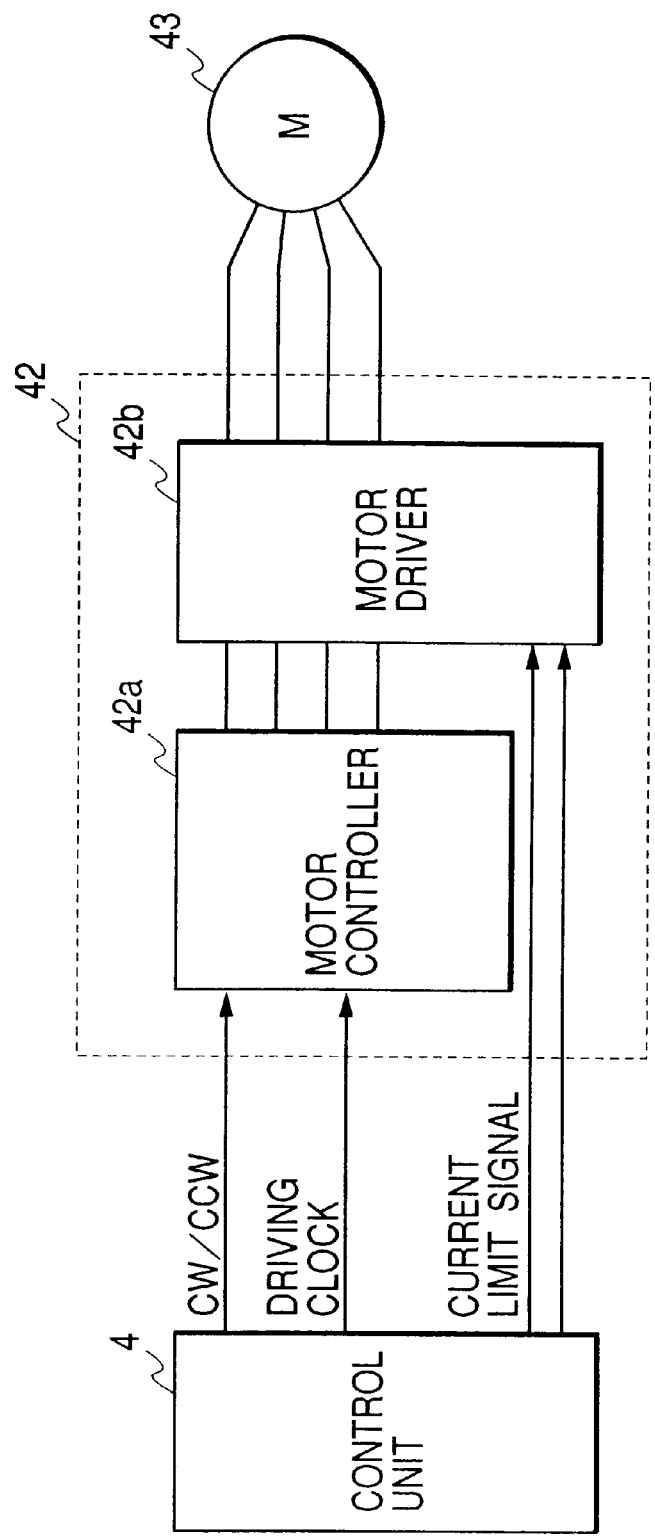
FIG. 12 is a block diagram showing a structure of a driver circuit for a motor.

FIG. 12 shows a structure of a driving circuit of an optical system driving motor (the above-described motor 43) for moving the optical system including the scanner unit 14, et al.

In FIG. 12, the above-described driver 42 is disposed between the control unit 4, which controls moving of the scanner unit 14, and the motor 43 which is a stepping motor for moving the scanner unit. The driver 42 includes a motor controller 42a for controlling drive of the motor 43 and a motor driver 42b for controlling drive of the motor 43 by controlling a current supplied to the motor 43.

When the original is read, the control unit 4 first supplies a current value limit signal to the motor driver 42b in order to select a limit current value from a plurality of preset values. In response to this signal, the motor driver 42b controls the value of the current to be supplied. In addition, the control unit 4 outputs to the motor controller 42a, a CW/CCW signal instructing a rotation direction of the motor 43. Then, the control unit 4 outputs to the motor controller 42a a driving clock indicating a driving timing of the motor 43. According to CW/CCW signal and driving clock, the motor controller 42a supplies an actual motor drive signal to the motor 43 through the motor driver 42b.

Figure 13:
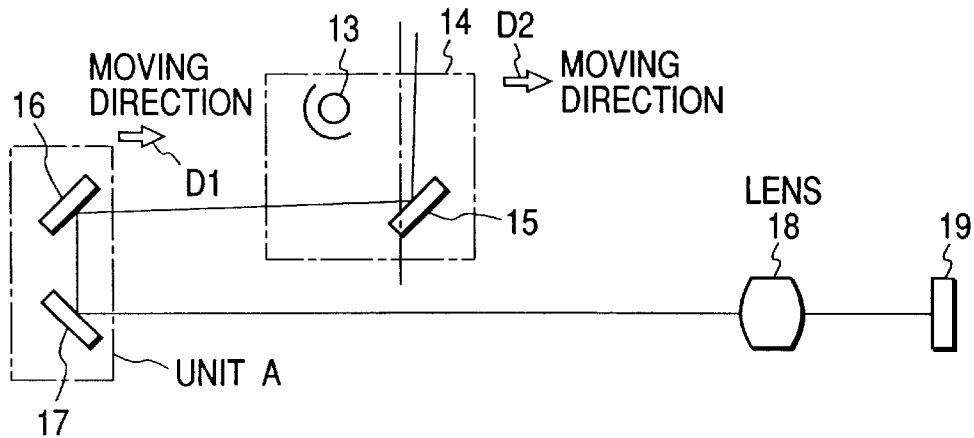

FIG. 13 shows the structure of the optical system including the scanner unit 14 and the like.

In FIG. 13, a unit A is used for making an optical path from the scanning position of a scanner unit 14 to CCD 19 always constant, and has mirrors 16 and 17 similar to those shown in FIG. 1. By moving the scanner unit 14 and unit A in the direction indicated by two arrows "D1" and "D2", an original image is scanned and CCD 19 reads the original image at predetermined times.

Figure 14:
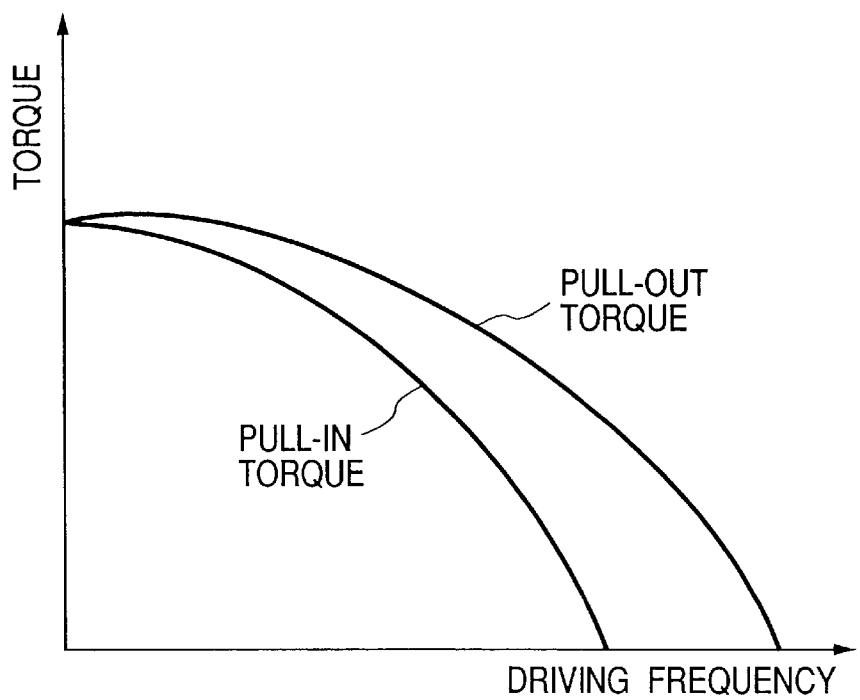
FIG. 14 is a diagram showing speed-torque characteristics of a stepping motor.

FIG. 14 is a graph showing ideal pull-in torque characteristics (starting characteristics) and pull-out torque characteristics (continuous running characteristics) of the motor 43 (stepping motor) used by the embodiment.

A stepping motor has generally pull-in and pull-out torque characteristics. A pull-in torque means a load torque which allows a stepping motor in a still state to operate without any misstep while drive pulses of a predetermined frequency are applied. The pull-in characteristics are the characteristics showing a relation between a drive frequency and a pull-in torque measured by changing the drive pulse frequency. A pull-out torque means a load torque when the operation becomes step-out as a load torque is gradually increased after a stepping motor is driven by drive pulses of a predetermined frequency. The pull-out characteristics are the characteristics showing a relation between a drive frequency and a pull-out torque measured by changing the drive pulse frequency.

As seen from FIG. 14, the lower the drive frequency is, i.e., the slower the motor drive speed is, the larger the pull-in and pull-out torques become.

A control procedure of supplying current to the motor 43 will be described, which procedure is characteristic to the second embodiment constructed as above and can reduce jags to be generated while an original image is read.

Figure 15A:
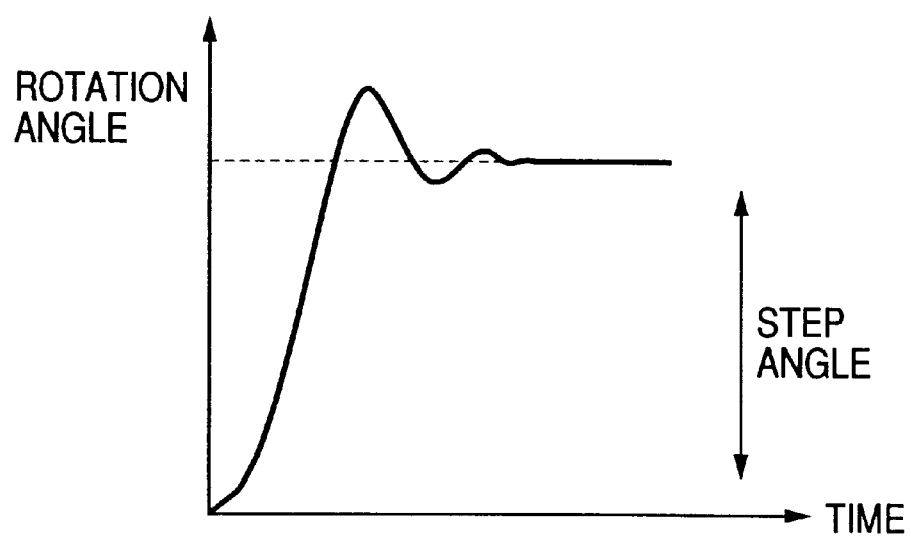
FIGS. 15A and 15B are diagrams showing the step response characteristics of the stepping motor.
Figure 15B:
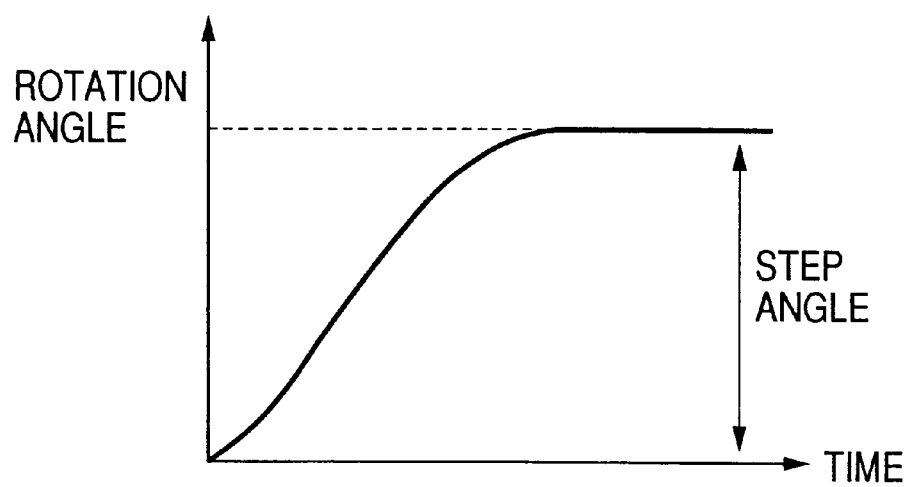

FIGS. 15A and 15B are graphs showing step response characteristics of the motor (stepping motor) 43. As seen from FIGS. 15A and 15B, if a steady drive torque is smaller than a load torque, acceleration control is performed at the drive start to gradually change to a steady drive speed from a drive speed capable of obtaining a start torque larger than the load torque, and deceleration control is performed at the drive end. The step response under the above conditions is shown in FIG. 15A. However, if the supply power is small or the drive frequency is high, the step response changes as shown in FIG. 15B. In this embodiment, the step response shown in FIG. 15B is utilized to reduce a power supply to the optical system drive motor during an original image read operation to thereby smoothly move the optical system and suppress jags of a read image.

Figure 16:
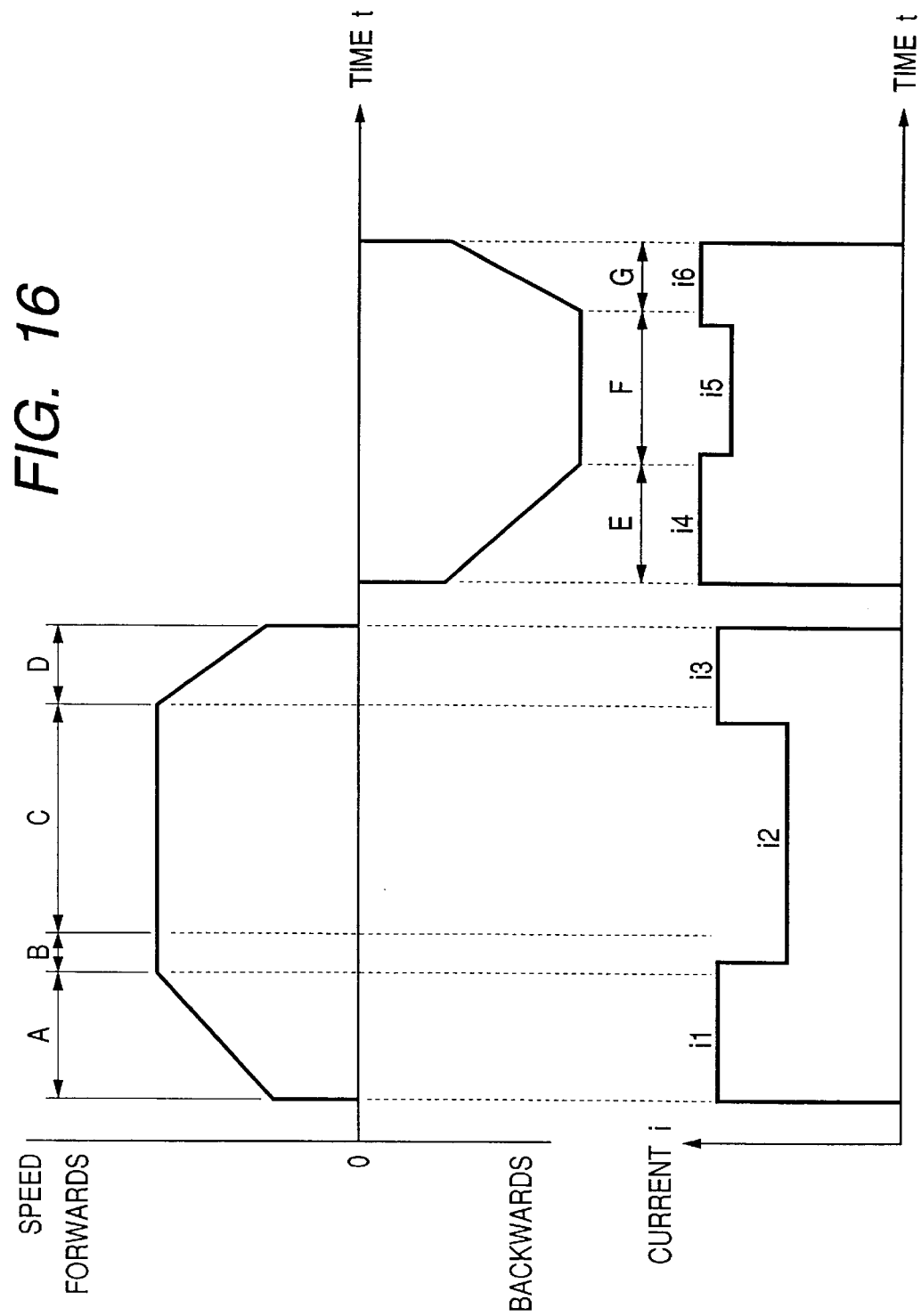
FIG. 16 is a timing chart illustrating a relation between a motor drive control and a current control.

FIG. 16 is a timing chart showing a relation between a motion control and a current of the motor 43.

The motion of the motor 43 is controlled to be accelerated and decelerated as shown in FIG. 16. During an acceleration period A, a large torque is required in order to accelerate from an optical system stop state to a steady motion speed. Therefore, a relatively large current i1 is supplied to the motor 43.

During a steady speed transition period B after the acceleration period A, acceleration applied to the optical system changes greatly so that vibrations are generated by a force of inertia of the optical system. In order to prevent position shift and step-out to be caused by the vibrations and reduce vibrations to be caused by an acceleration change, the current i1 continues to be supplied to the motor 43 up to an intermediate point during this transition period B.

After vibrations caused by acceleration are reduced, the current supplied to the motor 43 is switched to a current i2. This current i2 is set to a value smaller than the current i1 so that the optical system can move more smoothly during the period C than during the period A or B.

After the original image is completely read, the current supplied to the motor 43 is changed to a current i3 larger than the current i2. The current i3 is supplied during a period D. In this manner, a position shift by the force of inertial of the load can be prevented. During the backwards operation of the optical system (periods E to G), the current control similar to the above is performed.

Next, the operation of the control unit 4 will be described with reference to FIGS. 17 and 18.

Figure 17:
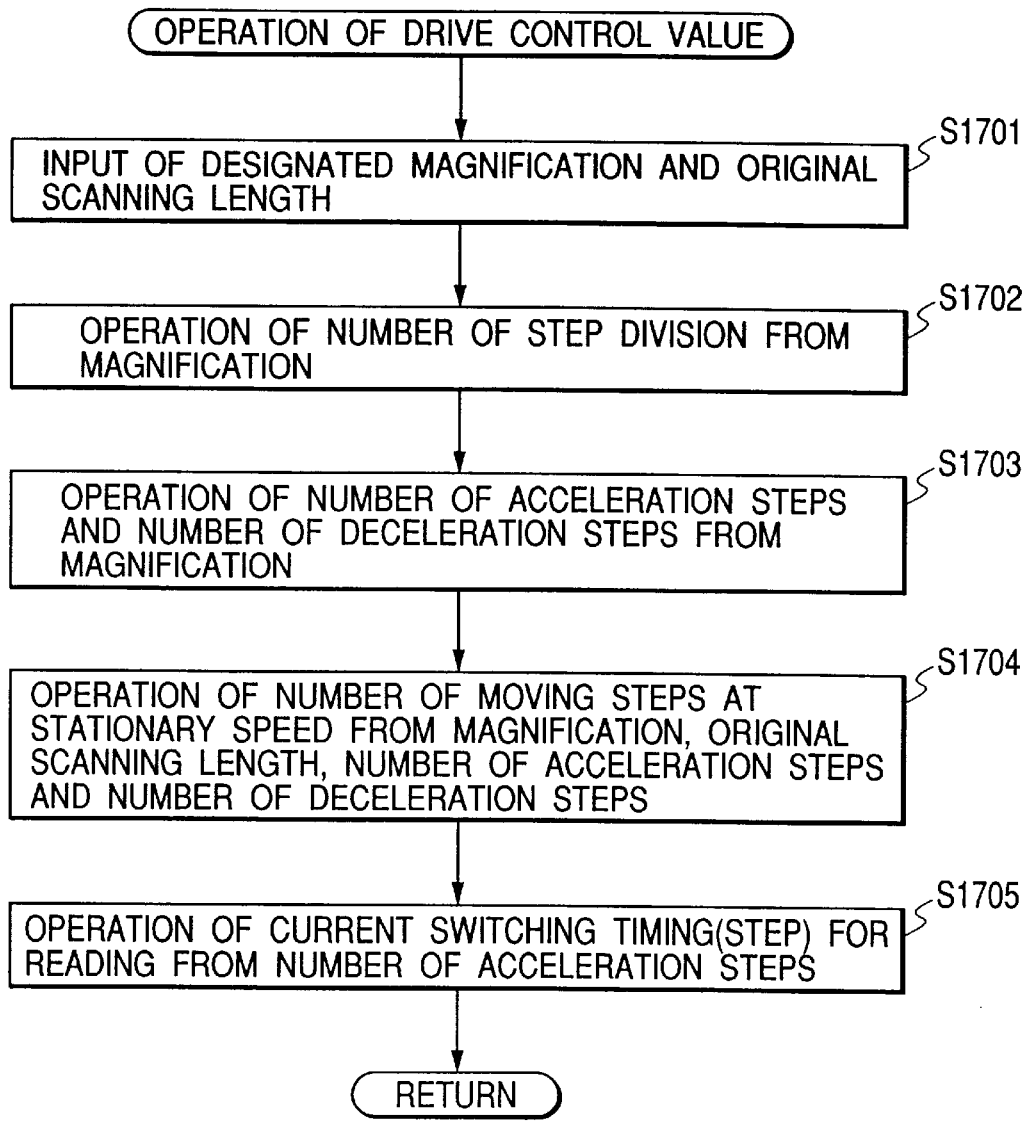
FIG. 17 is a flow chart illustrating a sequence of calculating a motor drive control value by a control unit.

FIG. 17 is a flow chart illustrating the process of calculating a drive control value of the motor 43 to be executed by the control unit 4.

As a user supplies the control unit 4 with a magnification factor and an original scanning length, by using the operation unit 5a shown in FIG. 11 to form an original image (Step S1701), the control unit 4 calculates a step division number for the micro-step drive (Step S1702) and an acceleration step number and deceleration step number (Step S1703) in accordance with the supplied magnification factor. Instead of entering the original scanning length by the operator, the original scanning length may be obtained by detecting the size of an original by using an original detection sensor.

In accordance with the supplied magnification factor and original scanning length and in accordance with the acceleration step number and deceleration step number calculated at Step S1703, a step number at a steady speed is calculated (Step S1704). In accordance with the acceleration step number calculated at Step S1703, current switching times are calculated (Step S1705) to thereafter terminate the process.

The acceleration step number is the number of steps of the motor 43 during the period A or E shown in FIG. 16. The deceleration step number is the number of steps of the motor 43 during the period D or G shown in FIG. 16. The steady step number is the number of steps of the motor 43 during the period C or F shown in FIG. 16.

Figure 18:
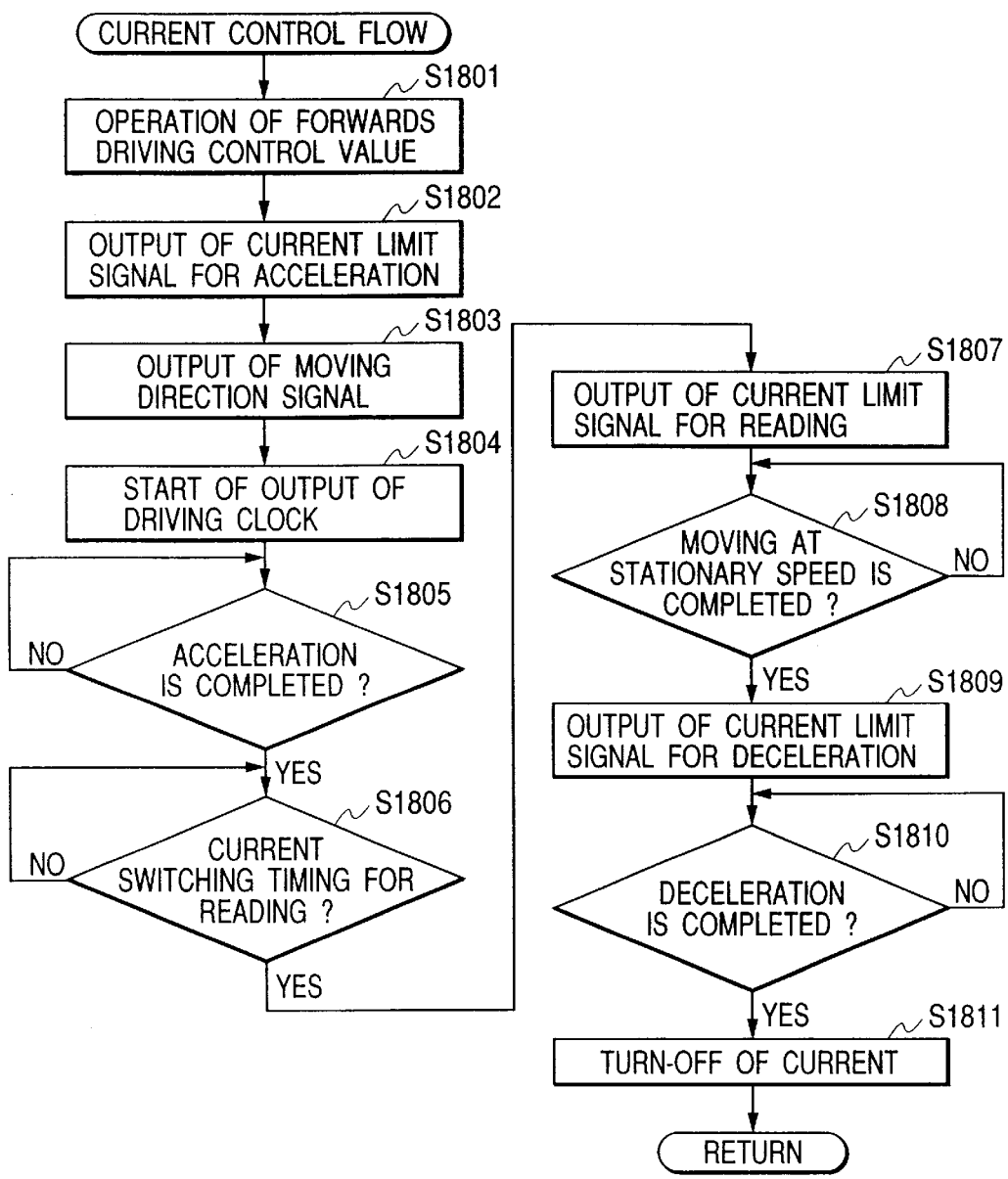
FIG. 18 is a flow chart illustrating a motor supply current control sequence by the control unit.

FIG. 18 is a flow chart illustrating a process of controlling a supply current to the motor 43 to be executed by the control unit 4.

First, the control unit 4 calculates various drive control values for the forwards scanning operation by using the process illustrated in FIG. 17 (step S1801) and supplies the motor driver 42b with a current control signal representative of a predetermined acceleration current limit, i.e., the current i1 shown in FIG. 16 (Step S1802). The control unit 4 sends an original reading rotation direction signal (signal representative of a motion direction of the optical system) to the motor controller 42a (Step S1803). An unrepresented timer is activated to start outputting a drive clock signal (Step S1804). In response to this drive clock signal, the motor 43 starts rotating (during the period A in FIG. 16).

It is judged whether the optical system is moved by the motor 43 by the acceleration step number calculated at Step S1703 (Step S1805). If not, Step S1805 is repeated until the optical system is moved by the acceleration step number, whereas if it is judged at Step S1805 that the optical system is moved by the acceleration step number, the steady speed step number calculated at Step S1704 is designated (for during the period B), and the operation enters a standby state until it becomes a current switching time counted by the timer (Step S1806).

If it becomes a current switching time at Step S1806, the control unit 4 sends a current limit signal representative of a predetermined current limit value for reading an original, i.e., the current i2 shown in FIG. 16, to the motor driver 42b (Step S1807). In this state, the original is read (during the period C in FIG. 16).

It is judged whether the optical system is moved by the motor 43 by the steady speed step number calculated at Step S1704 (Step S1808). If not, Step S1808 is repeated until the optical system is moved by the steady speed step number, whereas if it is judged at Step S1808 that the optical system is moved by the steady speed step number, the deceleration step number calculated at Step S1703 is designated (during the period D), and a current limit signal representative of a predetermined deceleration current limit value, i.e., the current i3 shown in FIG. 16 is supplied to the motor controller 42a (Step S1809). It is checked whether the deceleration is completed (Step S1810). If completed, the control unit 4 supplies the motor driver 42b with a signal instructing to turn off the supply current (Step S1811).

As above, the supply current to the motor 43 is controlled in accordance with the drive state of the motor 43. Specifically, during the start-up period (first operation state) of the motor 43, an acceleration current is supplied; during the stop period (second operation state) of the motor 43 after the deceleration completion, current is not supplied; and during a steady speed reading period (third operation state) of the motor 43, a reading current is supplied.

These operations are performed both during the forwards and backwards scanning operations, by changing the motion direction designated at Step S1803. However, the steady speed becomes higher during the backwards scanning period (fourth operation state) than during the forwards scanning operation. Therefore, slightly larger currents are supplied during the periods E to G.

Since the acceleration step number (acceleration distance) and deceleration step number (deceleration distance) change with the original reading magnification factor, the current values supplied during the acceleration and deceleration may be configured to be switched.

As described above, according to the second embodiment, the supply current to the motor serving as the driving means for the scanning optical system is changed in accordance with the drive states of the optical system, such as acceleration, steady speed motion, deceleration, and motion to the home position. It becomes therefore possible to reduce jags of a read image. Furthermore, since the supply current is changed in accordance with the drive state of the optical system, it becomes possible to suppress jags of a read image without degrading a read operation smoothness. Still further, since the supply current to the motor is controlled in accordance with the motion state of the motor, power consumption can be reduced.

Next, with reference to FIGS. 19 and 21, a third embodiment will be described.

Figure 19:
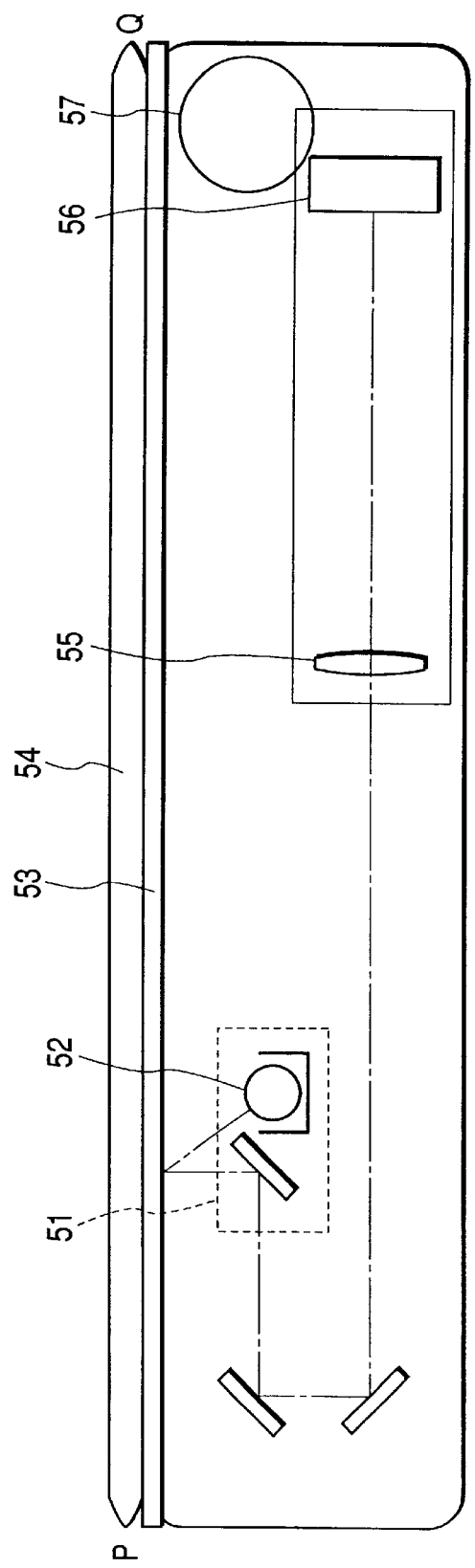
FIG. 19 is a block diagram showing a structure of an image reading system according to a third embodiment.

FIG. 19 is a block diagram showing the structure of an image reading system of a third embodiment. Referring to FIG. 19, the image reading system includes: a mirror unit 51 having an original illuminating lamp 52 and a mirror; an original support glass 53 for placing an original thereon; an original cover 54 for holding down an original placed on the original support glass 53; a lens 55 for focussing light radiated from the original illuminating lamp 52 and reflected from an original onto a CCD 56 as an image reading device; and a motor 57 for driving the mirror unit 51 for scanning an original.

In the image reading system constructed as above, an original is placed on the original support glass 53 with its image side being made in contact with the original support glass 53. The mirror unit 51 is moved by the motor 57 while the original illuminating lamp 52 illuminates the original to scan the original. As the mirror unit 51 is moved, the original is sequentially illuminated from a P side to a Q side shown in FIG. 19, and light reflected from the original is guided by a plurality of mirrors to a lens 55 and focussed onto CCD 56. The focussed image information is photoelectrically converted by CCD 56 into electrical signals which are read as an image signal and sent to an image processing system, a display device, and the like connected at a later stage.

Figure 20:
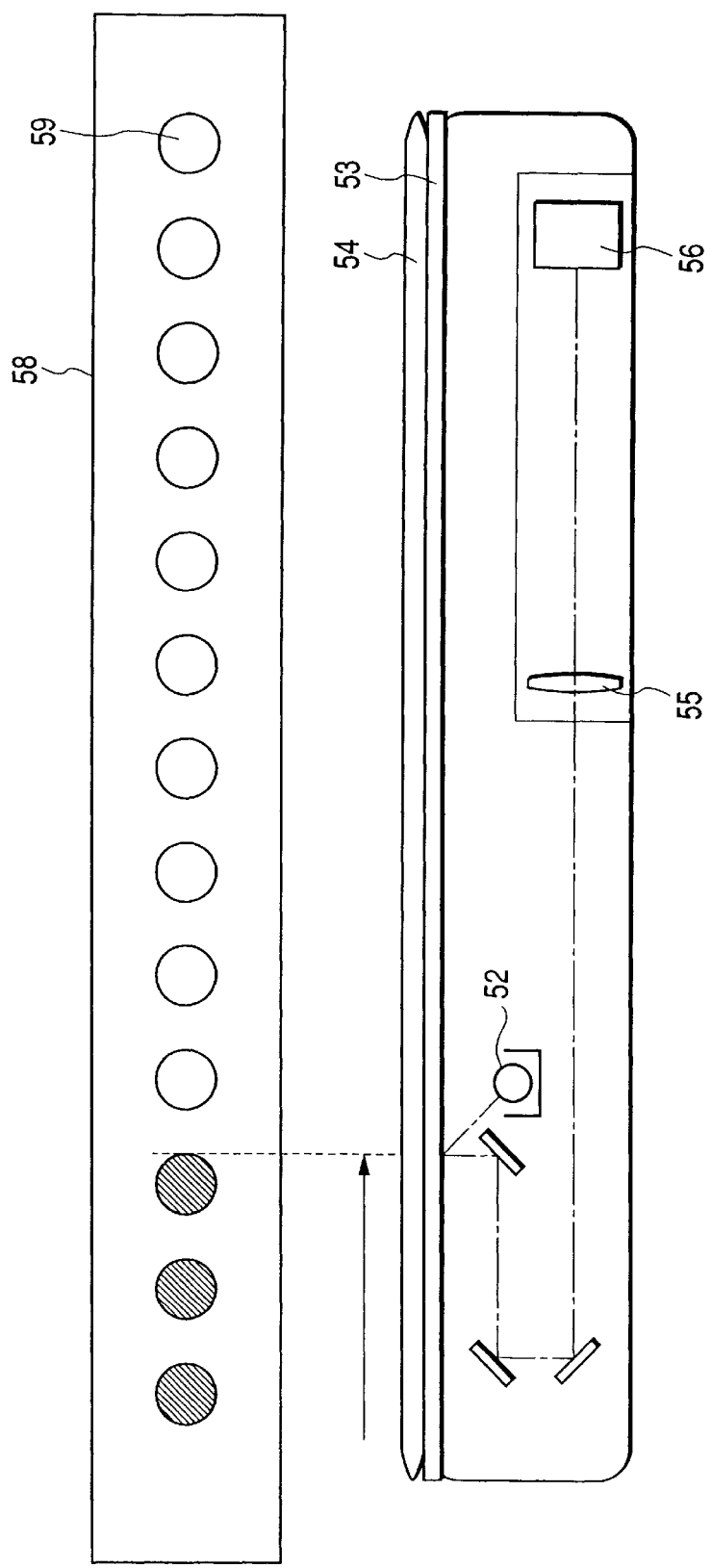
FIG. 20 is a diagram illustrating a relation between a display state of an operation panel of the image reading system shown in FIG. 19 and a drive state of a mirror mount unit of the image reading system.

FIG. 20 is a diagram illustrating a relation between an operation panel 58 of the image reading system shown in FIG. 19 and a drive state of the mirror unit 51. Referring to FIG. 20, on the operation panel 58, a plurality of LEDs 59 serving as a display means are disposed in line in parallel to the scanning direction of the mirror unit 51. It is preferable that the plurality of LEDs 59 have a total length covering at least the length of the original support glass so as to check the drive state of the mirror unit 51 over the whole original scanning area by a method to be described later.

Figure 21:
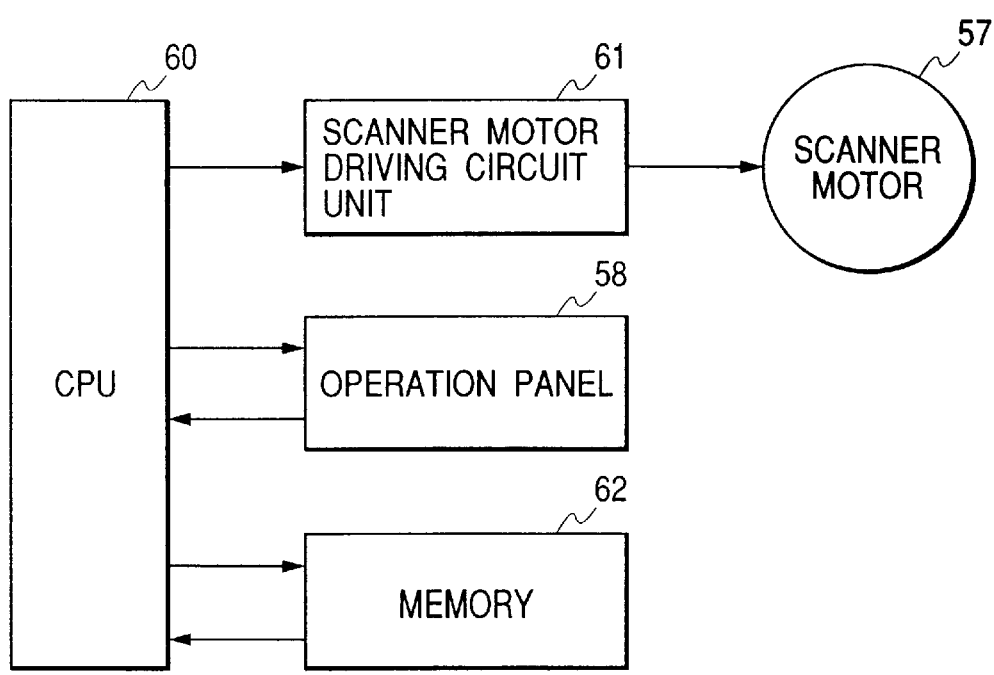
FIG. 21 is a block diagram showing a structure of a control unit for controlling the mirror mount unit of the image reading apparatus shown in FIGS. 19 and 20.

FIG. 21 is a block diagram showing the structure of a control unit for controlling the mirror unit of the image reading system shown in FIGS. 19 and 20.

Referring to FIG. 21, a CPU 60 controls the whole of the image reading system and is connected to a scanner motor driving circuit unit 61 for controlling the drive of the scanner motor 57, to the operation panel 58, and to a memory storing various data.

CPU 60 supplies a signal to the scanner motor driving circuit unit 61 at a predetermined timing set in memory 62 to scan the mirror unit 51. At the same time, CPU 60 sends a signal to the operation panel 58 to turn on LEDs 59 in accordance with the drive state of the mirror unit 51. With this construction, an operator can visually check at once the drive state of the mirror unit 51 even if the original cover 54 is closed during original scanning.

As described above, according to the third embodiment, the drive state of the mirror unit can be checked correctly during original scanning. Accordingly, it is possible to prevent the original cover 54 from being opened inadvertently during original scanning.

Many widely different embodiments of the present invention may be constructed without departing from the spirit and scope of the present invention. It should be understood that the present invention is not limited to the specific embodiments described in the specification, except as defined in the appended claims.

What is claimed is:

1. An image reading system comprising:
    (a) an illuminating unit which illuminates an original;
    (b) a reading unit which reads an image of the original illuminated by said illuminating unit;
    (c) a moving unit which causes said reading unit to move relative to the image in forward and backward directions;
    (d) a detection unit which detects at least one of a size of the original and a position of the original; and
    (e) a controller that controls said detection unit to detect the at least one of the size of the original and the position of the originals and said reading unit to read color information of the original when said moving unit moves said reading unit in the relatively forward direction, and that controls said reading unit to read color information of an area of the original when said moving unit moves said reading unit in the relatively backward direction,
    wherein the color information of the area of the original read during relative movement in the backward direction is not read by the reading unit during relative movement in the forward direction.

2. An image reading system according to claim 1, wherein said controller causes said reading unit to read first information of a first area of the image while being moved in the forward direction, and causes said reading unit to read first information of a second area of the image while being moved in the backward direction, wherein the first area and the second area are different from each other.

3. An image reading system according to claim 2, wherein the first information of the first area of the image is read during the motion in the forward direction and after a relative stabilization of light emitted from the illuminating unit.

4. An image reading system according to claim 3, wherein the first information detected during the motion in the backward direction is color information in an area other than the area from which the first information was detected during the motion in the forward direction.

5. An image reading system according to claim 1, wherein said detection unit further detects one of a presence and an absence of the original during the motion of said moving unit in the forward direction.

6. An image reading system according to claim 1, wherein said controller controls so that reading the original by moving said reading unit is started in a first period starting from a start of illumination of the original and said reading unit is moved in a second period subsequent to the first period to read the image on a same side of the original in both the forward and backward directions of the movement of said reading unit, and wherein said illumination unit emits light more stably in the second period than the first period.

7. An image reading system according to claim 6, wherein said illuminating unit emits more light in the second period than in the first period.

8. An image reading method comprising the steps of;
    (a) illuminating an original with an illuminating unit;
    (b) reading, with a reading unit, an image of the original illuminated in said illuminating step;
    (c) moving, with a moving unit, the reading unit relative to the image in forward and backward directions;
    (d) detecting at least one of a size of the original and a position of the original; and
    (e) controlling, (i) when the reading unit moves in the forward direction, said detection step and said reading step such that at least one of the size of the original and the position of the original is detected and said reading step such that color information of the original is read, and, (ii) when the reading unit moves in the backward direction, said reading step such that color information of an area of the original is read,
    wherein the color information of the area of the original read in the backward direction is not read by said reading step during motion in the forward direction.

9. An image reading method according to claim 8, wherein said controlling step includes controlling such that reading the original by moving the reading unit is started in a first period starting from a start of illumination of the original and the reading unit is moved in a second period subsequent to the first period to read the image on a same side of the original in both the forward an backward directions of movement of the reading unit, and wherein the illuminating unit emits light more stably in the second period than in the first period.

10. An image reading method according to claim 9, wherein the illuminating unit emits more light in the second period than in the first period.

11. An image reading method according to claim 8, wherein, in the controlling step, the reading step is controlled to read first information of a first area of the image while being moved by the moving unit in the forward direction and to read first information of a second area of the image being moved by the moving unit in the backward direction, wherein the first area and the second area are different from each other.

12. An image reading method according to claim 11, wherein the first information of the first area of the image is read during the motion in the forward direction and after a relative stabilization of light emitted from the illuminating unit.

13. An image reading method according to claim 12, wherein the first information of the second area of the image is color information.

14. An image reading method according to claim 8, wherein said detecting step detects one of a presence and an absence of the original during the motion of the moving unit in the forward direction.

15. A control apparatus for controlling an apparatus including an illuminating unit which illuminates an original, a reading unit which reads an image of the original illuminated by the illuminating unit, a moving unit which moves relatively the reading unit and original in forward and backward directions, relative to the original and a detection unit which detects at least one of size and a position of the original, said control apparatus comprising:

a control unit that controls said detection unit to detect the at least one of the size of the original and the position of the original and said reading unit to read color information of the original when said moving unit moves said reading unit in the relatively forward direction, and that controls said reading unit to read color information of an area of the original when said moving unit moves said reading unit in the relatively backward direction, wherein the color information of the area of the original read during relative movement in the backward direction is not read by the reading unit during relative movement in the foward direction.

16. A control method of controlling an apparatus including an illuminating unit which illuminates an original, a reading unit which reads an image of the original illuminated by the illuminating unit, a moving unit which moves relatively the reading unit and original in forward an backward directions, and a detection unit which detects at least one of a size and a position of the original, said control method comprising the steps of:

controlling, (i) when the reading unit moves in the forward direction, said detecting step such that at least one of the size of the original and the position of the original is detected and said reading step such that color information of the original is read, and, (ii) when the reading unit moves in the backward direction, said reading step such that color information of an area of the original is read, wherein the color information of the area of the original read during relative movement in the backward direction is not the information read by said reading step during relative movement in the forward direction.

17. A storing medium storing a program for executing the step of:

(a) illuminating an original with an illuminating unit;

(b) reading, with a reading unit, an image of the original illuminated in said illuminating step;

(c) moving, with a moving unit, the reading unit relative to the image in forward and backward directions;

(d) detecting at least one of a size of the original and a position of the original; and (e) controlling (i) when the reading unit moves in the forward direction, said detecting step such that at least one of the size of the original and the position of the original is detected and said reading step such that color information of the original is read, and, (ii) when the reading unit moves in the backward direction, said reading step such that color information of an area of the original is read, wherein the color information of the area of the original read in the backward direction is not read by said reading step during motion in the forward direction.

* * * * *

UNITED STATES PATENT AND TRADEMARK OFFICE
CERTIFICATE OF CORRECTION

PATENT NO. : 6,747,765 B2
DATED : June 8, 2004
INVENTOR(S) : Shingo Kitamura et al.

It is certified that error appears in the above-identified patent and that said Letters Patent is hereby corrected as shown below:

<u>Title page,</u>
Item [56], References Cited, U.S. PATENT DOCUMENTS,
"5,786,360 A    7/1998    Neely" should read
-- 5,786,560 A    7/1998    Tatah et al. --.
FOREIGN PATENT DOCUMENTS, "JP    7-177319    7/1995" (second occurrence) should be deleted.

<u>Column 1,</u>
Line 38, "of" (second occurrence) should be deleted.

<u>Column 2,</u>
Line 14, "an" should be deleted.

<u>Column 3,</u>
Line 8, "cross sectional" should read -- cross-sectional --.

<u>Column 6,</u>
Line 29, "judges" should read -- judge --.

<u>Column 7,</u>
Line 38, "glass 203." should read -- glass 202. --.

<u>Column 9,</u>
Line 54, "FIG. 8" should read -- FIG. 8, --.

<u>Column 10,</u>
Line 58, "cross sectional" should read -- cross-sectional --.

<u>Column 11,</u>
Line 18, "is" should read -- are --.

<u>Column 13,</u>
Line 3, "unit 4 which" should read -- unit 4. The --.
Line 34, "CW/CCW" should read -- the CW/CCW --.

UNITED STATES PATENT AND TRADEMARK OFFICE
CERTIFICATE OF CORRECTION

PATENT NO. : 6,747,765 B2
DATED : June 8, 2004
INVENTOR(S) : Shingo Kitamura et al.

It is certified that error appears in the above-identified patent and that said Letters Patent is hereby corrected as shown below:

<u>Column 19,</u>
Line 2, "size" should read -- a size --.

Signed and Sealed this

Twenty-third Day of May, 2006

JON W. DUDAS
*Director of the United States Patent and Trademark Office*